(12) United States Patent
Aman et al.

(10) Patent No.: US 9,555,310 B2
(45) Date of Patent: Jan. 31, 2017

(54) SPORTS SCOREKEEPING SYSTEM WITH INTEGRATED SCOREBOARD AND AUTOMATIC ENTERTAINMENT SYSTEM

(71) Applicant: Maxx Holdings, Inc., Toronto (CA)

(72) Inventors: James A. Aman, Scottsdale, AZ (US); Paul Michael Bennett, Toronto (CA)

(73) Assignee: Maxx Holdings, Inc., Toronto, Ontario ( * ) Notice: Subject to any disclaimer, the term of this patent is extended or adjusted under 35 U.S.C. 154(b) by 0 days.

(21) Appl. No.: 14/842,605

(22) Filed: Sep. 1, 2015

(65) Prior Publication Data

US 2016/0008695 A1    Jan. 14, 2016

Related U.S. Application Data

(60) Continuation of application No. 13/261,558, filed as application No. PCT/US2011/043307 on Jul. 8, 2011,
(Continued)

(51) Int. Cl.
| | |
|---|---|
| A63B 69/00 | (2006.01) |
| A63B 71/06 | (2006.01) |
| G07C 1/24 | (2006.01) |
| G09F 7/00 | (2006.01) |
| G09F 27/00 | (2006.01) |
| G09F 9/30 | (2006.01) |
| G06K 9/00 | (2006.01) |
| H04N 5/232 | (2006.01) |

(Continued)

(52) U.S. Cl.
CPC .......... *A63B 71/0669* (2013.01); *A63B 71/06* (2013.01); *G06K 9/00724* (2013.01); *G07C 1/28* (2013.01); *G09F 7/002* (2013.01); *G09F 9/301* (2013.01); *G09F 27/00* (2013.01); *H04N 5/232* (2013.01); *H04N 7/181* (2013.01); *A63B 24/0021* (2013.01); *A63B 2024/0025* (2013.01); *A63B 2024/0028* (2013.01); *A63B 2102/24* (2015.10); *A63B 2220/12* (2013.01); *A63B 2220/62* (2013.01); *A63B 2220/806* (2013.01); *A63B 2225/20* (2013.01); *A63B 2225/50* (2013.01)

(58) Field of Classification Search
CPC combination set(s) only.
See application file for complete search history.

(56) References Cited

U.S. PATENT DOCUMENTS

| | | |
|---|---|---|
| 5,065,251 A | 11/1991 | Shuhart, Jr. et al. |
| 5,517,300 A | 5/1996 | Parker et al. |

(Continued)

OTHER PUBLICATIONS

Article titled "EthoVision: A versatile video tracking system for automation of behavioral experiments," 2001; author Lucas P.J.J. Noldus, Andrew J. Spink and Ruud A.J. Tegelenbosch.

(Continued)

*Primary Examiner* — Travis Hunnings
(74) *Attorney, Agent, or Firm* — Ulmer & Berne LLP

(57) ABSTRACT

An on-demand sports video streaming service generates live broadcasts of sporting events with an automated video capture system. Multiple cameras automatically which track game play are controlled to create a combined output. Game event data, including scoreboard information, audible queues or visual queues are implemented to assist in directing and controlling video content and to provide scoring, timing or player information into the video output.

20 Claims, 15 Drawing Sheets

Related U.S. Application Data now abandoned, said application No. 13/261,558 is a continuation-in-part of application No. PCT/US2009/056805, filed on Sep. 14, 2009, application No. 14/842,605, which is a continuation-in-part of application No. 14/703,337, filed on May 4, 2015, which is a continuation-in-part of application No. 12/438,613, filed as application No. PCT/US2007/019725 on Sep. 11, 2007, now Pat. No. 9,025,021, application No. 14/842,605, which is a continuation-in-part of application No. 14/626,973, filed on Feb. 20, 2015, which is a continuation-in-part of application No. 11/578,710, filed as application No. PCT/US2005/013132 on Apr. 18, 2005, now Pat. No. 9,094,615, said application No. 11/578,710 is a continuation-in-part of application No. 10/006,444, filed on Nov. 20, 2001, now Pat. No. 7,483,049, which is a continuation-in-part of application No. 09/510,922, filed on Feb. 22, 2000, now Pat. No. 6,707,487, and a continuation-in-part of application No. 09/197,219, filed on Nov. 20, 1998, now Pat. No. 6,567,116, and a continuation-in-part of application No. 09/881,430, filed on Jun. 14, 2001, now abandoned, which is a continuation-in-part of application No. 09/197,219, filed on Nov. 20, 1998, now Pat. No. 6,567,116, said application No. 09/510,922 is a continuation-in-part of application No. 09/197,219, filed on Nov. 20, 1998, now Pat. No. 6,567,116, application No. 14/842,605, which is a continuation-in-part of application No. 14/482,362, filed on Sep. 10, 2014, which is a division of application No. 10/006,444, filed on Nov. 20, 2001, now Pat. No. 7,483,049, and a continuation of application No. 12/287,339, filed on Oct. 8, 2008, now Pat. No. 8,965,898, which is a division of application No. 10/006,444, filed on Nov. 20, 2001, now Pat. No. 7,483,049, said application No. 14/482,362 is a continuation-in-part of application No. 09/510,922, filed on Feb. 22, 2000, now Pat. No. 6,707,487, said application No. 12/287,339 is a continuation-in-part of application No. 09/197,219, filed on Nov. 20, 1998, now Pat. No. 6,567,116, said application No. 14/482,362 is a continuation-in-part of application No. 09/197,219, filed on Nov. 20, 1998, now Pat. No. 6,567,116.

(60) Provisional application No. 61/399,167, filed on Jul. 8, 2010, provisional application No. 61/192,034, filed on Sep. 15, 2008, provisional application No. 60/843,677, filed on Sep. 11, 2006, provisional application No. 60/563,091, filed on Apr. 16, 2004.

(51) Int. Cl.
*H04N 7/18* (2006.01)
*G07C 1/28* (2006.01)
*A63B 24/00* (2006.01)

(56) References Cited

U.S. PATENT DOCUMENTS

| | | | |
|---|---|---|---|
| 5,912,700 A | 6/1999 | Honey et al. | |
| 6,141,041 A | 10/2000 | Carlbom et al. | |
| 6,154,250 A * | 11/2000 | Honey | A63B 71/0605 348/157 |
| 6,274,978 B1 | 8/2001 | Roach et al. | |
| 6,359,647 B1 * | 3/2002 | Sengupta | G08B 13/19608 348/143 |
| 6,441,846 B1 | 8/2002 | Carlbom et al. | |
| 6,603,711 B2 | 8/2003 | Calace | |
| 6,822,693 B2 * | 11/2004 | Bates | H04N 5/4401 348/553 |
| 6,950,123 B2 | 9/2005 | Martins | |
| 7,047,157 B2 | 5/2006 | Li | |
| 7,312,812 B2 | 12/2007 | Li et al. | |
| 7,782,363 B2 | 8/2010 | Ortiz | |
| 7,876,352 B2 | 1/2011 | Martin | |
| 7,884,855 B2 | 2/2011 | Ortiz | |
| 7,916,171 B2 * | 3/2011 | Sugano | G06F 17/30799 348/143 |
| 7,956,891 B2 | 6/2011 | Uchihara | |
| 8,091,111 B2 | 1/2012 | Logan et al. | |
| 8,125,529 B2 | 2/2012 | Skoskiewicz et al. | |
| 8,335,345 B2 | 12/2012 | White et al. | |
| 8,339,456 B2 * | 12/2012 | Eledath | G06K 9/209 348/154 |
| 9,025,021 B2 * | 5/2015 | Aman | A63B 24/0003 348/135 |
| 2004/0244034 A1 | 12/2004 | Saltzek | |
| 2005/0005308 A1 | 1/2005 | Logan et al. | |
| 2005/0183273 A1 | 8/2005 | Amron et al. | |
| 2007/0279494 A1 * | 12/2007 | Aman | G01S 3/7864 348/169 |
| 2009/0019747 A1 | 1/2009 | Rosa | |
| 2009/0223433 A1 | 9/2009 | Cowen et al. | |
| 2009/0251298 A1 * | 10/2009 | Dakers | A63B 71/0605 340/323 R |
| 2011/0013087 A1 | 1/2011 | House et al. | |
| 2012/0087637 A1 * | 4/2012 | Logan | H04H 20/28 386/241 |
| 2013/0191752 A1 | 7/2013 | Lapierre et al. | |
| 2013/0227416 A1 | 8/2013 | Massena et al. | |
| 2014/0002663 A1 | 1/2014 | Garland | |
| 2015/0040036 A1 | 2/2015 | Crocker et al. | |
| 2015/0058781 A1 | 2/2015 | Malik et al. | |

OTHER PUBLICATIONS

Website blog titled "Hybrid Aims to Cut Costs for Live Sports With Automated 'Sport Track System'"; dated Jun. 14, 2013; author Jason Dachman, Editor.

Article in the International Journal of Emerging Technology and Advanced Engineering, titled "A Review Paper on Player Tracking and Automated Analysis in Sports Videos"; dated Jun. 2015; author Nikhil M. Sreejith S.

Article in the FAA's 3rd International Aviation Security Technology Symposium, titled "Gate-to-Gate automated video tracking and location"; dated Nov. 2001; author Sangkyu Kang, et al.

Article titled "Automatic tracking of indoor soccer players using videos from multiple cameras," 2012; author Erikson Morals, et al., University of Campinas.

Paper titled "Automatic Tracking of Moving Objects in Video for Surveillance Applications," submitted to the Dept. of Electrical Engineering & Computer Science of the Graduate School of the University of Kansas; dated Jul. 18, 2007; author Manjunath Narayana.

Article titled "An automatic system for sports analytics in multi-camera tennis videos"; Used in conjunction with 2013 10th IEEE International Conference on Advanced Video and Signal Based Surveillance; dated 2013; Author Rafael Martin Nieto and Jose Maria Martinez Sanchez, University of Madrid.

Dissertation titled "Content-Based Sports Video Analysis and Composition"; dated Dec. 1, 2006; author Wang Jinjun; presented to the School of Computer Engineering of the Nanyang Technological University.

* cited by examiner

*Fig. 7c* Universal Action Command (UAC) - Preferred Format

| | UAC Data Field | Description / Purpose |
|---|---|---|
| | Device Type | Represents entire class of AES device, e.g. "Audio System" |
| Opt | Device ID | Represents specific AES device within class, e.g. "Rink 2 Audio System". = IP Address xxx |
| | Data Source Type | Local DB, Remote DB, Local Data Stream, Remote Data Stream, Attached Data File |
| Opt | Data Source Connection | Necessary Connection name to local or remote DB or Stream |
| | Data Source Name | Name of DB, Stream or Attached File |
| Opt | Data Source Use | Primary, Overlay (audio / video mixing in e.g. of backround music or video banners) |
| Opt | Data Source Inclusion Filter | SQL select statement for choosing from DB |
| Opt | Data Source Exclusion Filter(s) | Specific Preferences list(s) for further limiting SQL select |
| | Data File Format | Identifies underlying format of data |
| Opt | Data File Start/Stop Control | Controls start-point (e.g. SS:TT:MM from 0:00) and stop-point (if not specified wait until terminate or end-of-file) |
| Opt | Initiation Transition Script | Script to control optional features of Device Type, e.g. increase output from 0 to 10 over 1 sec |
| Opt | Termination Transition Script | Script to control optional features of Device Type, e.g. decrease output from 10 to 0 over 1 sec |
| Opt | Data File | Actual attached data file |
| | Command | Initiate Output (DB selection modifiers: Next (after prior), Random, Random Exclude Prior) |
| | | Terminate Output |

*Fig. 7d*

AES Device Type UAC examples

| Part | AES Device Type | General Purposes | Data Source Type & Use (i.e. Primary vs. Overlay) | Example Data Outputs |
|---|---|---|---|---|
| 400-15 | Audio System | Announcements, Commentary, Music, Ads | Attach to Audio Data Stream | Audio Out 1: (Facility Music & Announcements), Audio Out 2: (selected radio station) |
| | | | | Audio Out 3: (Game Announce), Audio Out 4: (Wireless mic, e.g. on-ice coach in training situation) |
| | | | | Local Data Stream 1: (Automated Game Commentary in text to be converted to speech) |
| | | | Output Audio Data File | Offical Game Announcement, Facility Announcement, Advertisment |
| | | | | Music / Sound Clip, Official Sounds: Whistle, Horn |
| 400-16 | Video Display | Scoreboard, Announcements, Replays, Ads | Attach to Video Data Stream - Primary | Video Output 1: Scorekeeper's Console virtual scoreboard |
| | | | | Video Output 2: Automatic Game Broadcast - Real-time Mix |
| | | | | Video Output 3: Automatic Game Broadcast - Extended Mix |
| | | | Attach to Video Data Stream - Overlay | Video Banner 1, 2, 3, etc. |
| | | | Output Video Data File | Game Video Replay, Offical Game Announcement, Facility Announcement, Advertisment |
| 400-17 | Goal Lamp | Scoring and Time-Out/End Indicator | Output Lighting Effect Data File | Script N: (indicates Shot, Goal, Type of Goal, Period End, Game End, etc.) |
| 400-18a | Electro-Mechanical Shutter | Accent Lighting | Output Lighting Effect Data File | Dim, Flash, Brighten, etc. selected Lighting |
| 400-18b | Laser Projector | Accent Lighting | Output Lighting Effect Data File | Project Graphic: Team, Facility, Ad, Project Visual Effect (enable sound sync) |
| 400-19 | Dynamic Display Board | Scoreboard, Announcements, Replays, Ads | Output Video Data File | Game Video Replay, Offical Game Announcement, Facility Announcement, Advertisment |
| | | | | Other Game Scoreboard Summaries |
| | | | Output Lighting Effect Data File | Dim, Flash, Brighten, etc. selected Lighting |
| other | Area Fogger | Environment Effects | Output Environment Effect Data File | Create Fog |
| other | LED Lighting System | Accent Lighting | Output Lighting Effect Data File | Dim, Flash, Brighten, Change Colors etc. selected Lighting |

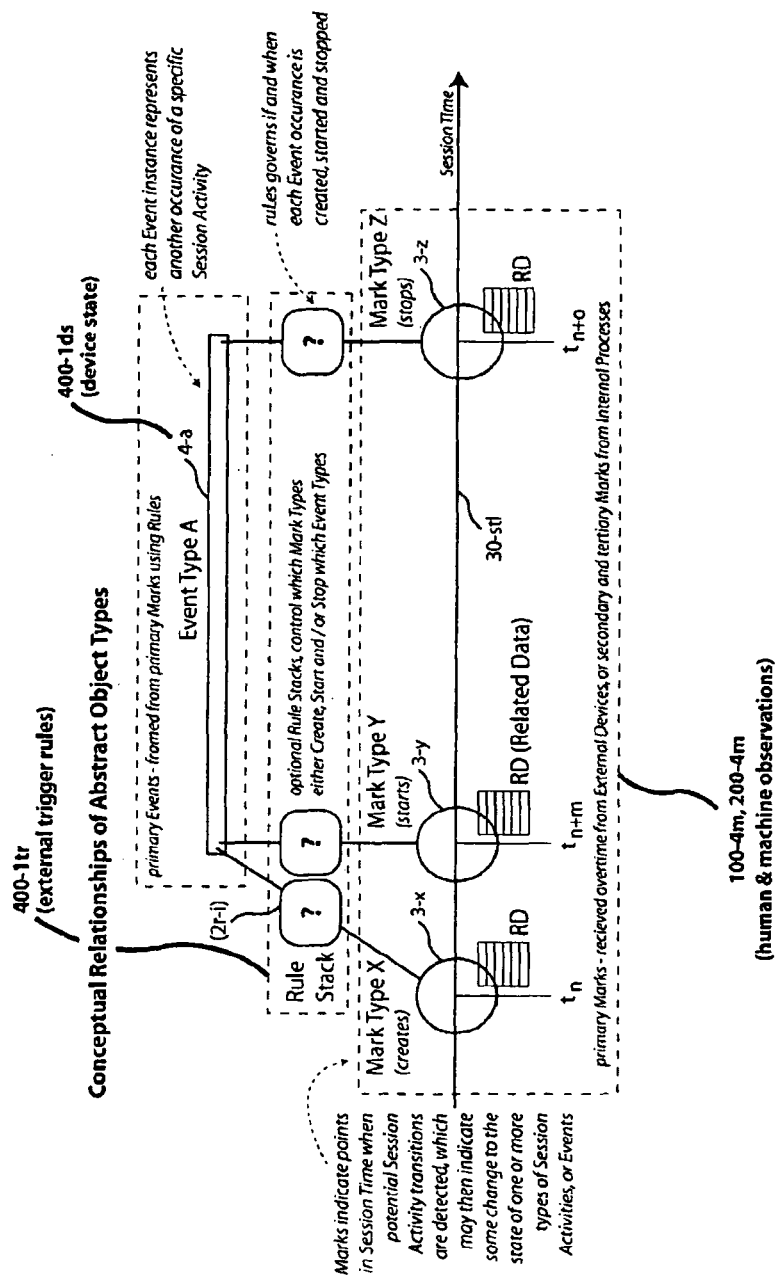

SPORTS SCOREKEEPING SYSTEM WITH INTEGRATED SCOREBOARD AND AUTOMATIC ENTERTAINMENT SYSTEM

RELATED APPLICATIONS

The present invention is a Continuation In Part of PCT/US2009/056805 filed on Sep. 25, 2009 entitled SESSION AUTOMATED RECORDING TOGETHER WITH RULES BASED INDEXING, ANALYSIS AND EXPRESSION OF CONTENT, (herein also referred to as SARTRIA) of which the present application claims priority. (Note that the above application claimed the priority of U.S. 61/192,034, a provisional application filed on Sep. 15, 2008 of the same title.)

The present invention is also related to the prior inventions: U.S. Pat. No. 6,567,116 entitled MULTIPLE OBJECT TRACKING SYSTEM and U.S. Pat. No. 7,483,049 entitled OPTIMIZATIONS FOR LIVE EVENT, REAL-TIME, 3D OBJECT TRACKING.

FIELD OF INVENTION

The present invention relates to systems for automatically controlling a sports scoreboard, music and announcement systems, video displays, scoring indication lamps, primary arena lighting systems, laser show and secondary lighting systems, dynamic advertising display boards and other event entertainment devices.

BACKGROUND AND SUMMARY OF THE INVENTION

There are a large number of sporting fields where scoreboards are used to display official game information to the teams and spectators, such as in the sports of ice hockey, football, basketball, baseball and others. Especially when these fields are used for amateur sports, the scoreboards carry basic information such as the official game time, period of play and team scores. There are several manufacturers of these types of amateur sport scoreboards most notably Daktronics, Inc., the largest supplier to the youth market.

Scoreboard systems from manufacturers such as Daktronics typically include at least two parts, the scoreboard itself as well as a console for remotely operating the scoreboard. The typical console has a keypad interface for the console operator, an internal processor for translating the operator's indications into scoreboard changes, and one or more output ports for transmitting these changes in some format to one or more scoreboards. There are several problems with this overall arrangement including the lack of interface with a third-party system scorekeeping system, where such a system might be used for creating content regarding the sporting event itself.

In prior applications, especially including the prior related SARTRIA application, the present inventors taught several aspects of such content generating systems, mostly using the example of ice hockey. The types of content created include recorded video and audio along with official boxscore information. The present inventors have also taught several variations of using the same recorded video captured as content, to support tracking of the players and game objects via image analysis. When synchronized and cross-indexed, the video, audio, boxscore and tracking data have significantly greater use and value.

Such systems for creating content as taught by the present inventors still require that an individual operate the game scoreboard. Hence, even though these systems gather the official game scoring information, or box score, they don't also operate the scoreboard. The main reason for this is that manufacturers such as Daktronics tend to keep their scoreboard console "closed," not allowing for third-part equipment to be electronically interfaced.

What is needed is a universal scoreboard interface module by which any or most manufacture's scoreboard consoles or scoreboards can be interfaced, so that any third party content generation system may directly control the scoreboard, thus removing the need for the scoreboard console operator.

In the present invention, two variations are taught of a first embodiment—one for interfacing directly to the console, simulating the use of the keyboard by a console operator, and the second for interfacing directly to the scoreboard, simulating the control signals sent by the console. Regardless of the interface point, the present invention first comprises a training mode whereby an operator trains the interface device regarding the appropriate signals for mimicking either the keyboard signals input to the console, or the resulting control signals sent to the scoreboard by the console. This training may either be fully automatic, or simply the recording of appropriate signals to be analyzed by a programmer of the interface device. Once analyzed, the programmer will then establish the necessary data within the interface device so that in its live operation, it will send identical signals to either the manufacturer's console (thus mimicking the keypad entries) or to the manufacturer's scoreboard itself (thus mimicking the console.)

Once trained, the interface module may then be connected to a third party scorekeeping system which in turn then supplies the necessary high-level commands such as "set clock to 99:99," "start clock," "stop clock," "enter penalty . . . ," etc., as the sporting event is conducted. In this live mode, for each supplied high-level command the interface module then generates the equivalent keyboard signals for input to the console, or resulting control signals for direct input to the scoreboard.

In a second alternate embodiment, the universal scoreboard interface does not require a training mode and simply connects directly to the scoreboard thus completely by-passing the manufacturer's console. In this case, the third party scorekeeping system maintains an internal virtual scoreboard which the interface device monitors for output to the scoreboard. As will be shown, the ideal output format conforms to the requirements of the scoreboard and at least for manufacturer's such as Daktronics, therefore includes signals for setting the individual cell segment values for each displayed character on the scoreboard.

Using either variation of the universal scoreboard interface eliminates the need to operate the scoreboard manufacturer's console, which at the youth sports level often means the reduction of at least one job (note that a person is still required to operate the third party scorekeeping console.) The present inventors will herein teach an additional preferred embodiment to scorekeeping system that combines the use of a performance content generation system to ultimately also eliminate this need for an operator of the third party scorekeeping console. As will be shown, using the aforementioned universal scoreboard interface the main functions of a scorekeeping console are to set, reset, start and stop the official clock and to enter the remaining official scorekeeping information, which in ice hockey for example includes data captured while the game is in progress (shot counts by team,) and data captured while the game is halted (such as goals and penalties.) The only remaining information entered by the scorekeeper is non-official and therefore to some extent optional.

In this "scorekeeperless" configuration of the scorekeeping system, the official clock is maintained by a combination of a game official and the performance content generation system, which itself includes some form of an object tracking system. (While other technologies such as RF, IR, UWB, GPS, etc. may be used for tracking the performance activities and still accomplish the herein taught improvements, the present inventors prefer and depict a camera based object tracking system for following the player, referee and game object movements.) As will be shown, using the object tracking system the moment of puck-drop is automatically detectable for starting the clock and a game official can at least use a wireless clicker instead of a whistle to stop play and the clock. It will also be shown that once the official presses the "stop-play" clicker button, the system can automatically generate the customary whistle sound for notifying the players, team benches and fans. Those familiar with referee whistle technology will understand that variations are possible since technology already exists for automatically detecting the whistle's sound waves.

The present invention will then also teach that the "scorekeepless" system employs through-the-glass touch technology to face the "game-play halted" data entry screen towards the game official. Doing this allows a referee to directly enter all official information such as goals and penalties, as opposed to the traditional practice of speaking to the scorekeeper who then appropriately records the information either electronically or on paper. And finally, at least for the sport of ice hockey, the only other official information is the shot count by team that has at least two ways of being collected without requiring a scorekeeper present in the traditional scorekeeper's booth. The preferred method is to automatically track shots using the performance content generation system via its object tracking system, techniques that are both well understood and in some sports such as soccer already implemented. The alternate technique is to allow an operator to use a wireless or internet linked portable tablet or similar device to indicate shot counts from any desired location, e.g. from the stands. As will also be taught, this operator can additionally use this remote data entry solution for optionally entering desirable non-official game information, e.g. player shifts, hits, face-off locations, etc. However, most of this additional non-official game information may also be automatically determined using a performance content generation system, especially and preferably as taught by the present inventors in the prior SARTRIA application.

In addition to allowing a third-party scorekeeping system to automatically and directly control a given manufacturer's scoreboard, it is also desirable to automatically control other devices such as the music and announcement system, video displays, scoring indication lamps, primary arena lighting systems, laser show and secondary lighting systems as well as dynamic advertising display boards. In general, the desired other devices to control are usable for enhancing the enjoyment of the performance spectators and as will be discussed in the conclusion of this application, other types of "entertainment devices" exist and can also be automatically controlled using the herein taught system. What will be taught is the combining of the scorekeeping system and the performance content generation system for the enabling of an automatic entertainment system, which then controls any number of connected entertainment devices such as listed above.

In the present inventors' prior patents and applications, there was taught the integration of a real-time multiple object tracking system, preferably based upon cameras and machine vision, that was capable of capturing game video and audio, player and referee movements, wireless clicker signals, as well as any and all other real-time human or machine observations. In these applications, a universal protocol was also taught for encoding any human or machine observation into "marks" of a given type, with a specific time of observation and optionally carrying related data further describing the observation. In turn, these observation marks where input into a session processor that had access to external rules, where the rules directed how the incoming real-time marks should potentially create, start or stop individual events of a given type. These events then service as a session index back into all recorded continuous session content such video and audio.

It is now further herein taught that these same observation marks and events may be translated by the session processor into a real-time data stream of automatic entertainment system (device) triggers. The actual triggers output by the session processor are first filtered (or limited) based upon the specific types of entertainment devices to be commanded (e.g. a music system, announcement system, video display, etc.) The present inventors prefer that these triggers as output by the session processor are accepted by a distinct automatic entertainment system processor that is responsible for interfacing directly with any and all third party devices. For each device type, the entertainment processor will have access to a pre-known set of external trigger rules that can be used to translate the incoming session content (i.e. detected marks and events) into a set of outgoing universal action commands for each given device type. These universal action commands are then accepted by individual device wrappers that preform a final translation of the universal command into one or more custom application programming interface (API) sequences that are pre-established to cause specific resulting actions by the unique physical device.

The present inventors prefer this distinct multi-step translation from agnostic session content into streams of session triggers filtered by entertainment device type, which in turn are convertible into universal action commands for the given device type via a set of external trigger rules, which are then finally translated into custom (API) sequences for driving individual unique third-party entertainment devices. This combination of double abstraction and objectification allows the connection chain from the session processor, entertainment system and unique entertainment devices to remain loosely connected and therefore both open and easily distributable.

Within the forthcoming specification, the present inventors will provide examples of specific game observations along with the resulting performance activity (event) create/start/stop transitions and how these transitions appropriately and ultimately may be used to control various entertainment device actions—such as starting and stopping music, making announcements, showing video replays, turning on goal lamps, dimming arena lights, etc.

The present inventors will also review some relevant teachings of the prior SARTRIA application for a SESSION AUTOMATED RECORDING TOGETHER WITH RULES BASED INDEXING, ANALYSIS AND EXPRESSION OF CONTENT. During this review of the prior taught apparatus and methods of a session processor, the present inventors will show that these same teachings with one preferred modification are also applicable and preferred for the implementation of the herein specified automatic entertainment system processor.

Therefore, given the state-of-the-art in computer systems, FPGAs, microcontrollers, wireless clicker technology, through-the-glass touch panels, data transmission protocols, and object tracking systems, it is possible to create the preferred system for automatically interfacing a third-party content generation system (that at least also accepts the official scorekeeping data) with any or most existing scoreboard systems, and that this system can be further enhanced to eliminate the need for a scorekeeper.

Given the state-of-the-art in real-time sports tracking, content capture and performance analysis systems, it is also possible to create the preferred sports entertainment system for automatically interfacing to one or more entertainment devices, the control of which is ultimately linked to the game activities measured by the tracking system via external rules that may be altered without needing to change the entertainment system itself.

Objects and Advantages

Therefore, the objects and advantages of the present invention include providing a universal interface module that can be connected to a scoreboard console either at the juncture between the console's keyboard and its internal processor, or between its internal processor and the scoreboard itself (via the console's output port.) This interface module provides both training and live modes. In the training mode, the module is capable of recording various signals that are either supplied by the keyboard to the console, or by the console to the scoreboard, representing the entire range of possible low-level commands performed by the manufacturer's scoreboard console. In the live mode, the module is capable of receiving high-level commands from a third-party scorekeeping console which are then translated into the equivalent low-level commands and transmitted either to the scoreboard console via the keyboard, as if they were being directly entered by the console operator, or transmitted to the scoreboard, as if they were being generated by the manufacturer's console.

It is still a further object and advantage of the present system that this interface module be alternately cable of connecting to a third-party scorekeeping console to a scoreboard without requiring a training mode. In this case, the scorekeeping console maintains an internal virtual scoreboard that the interface module translates into the necessary signals for updating the real scoreboard.

Another object and advantage of the present system is to provide for a scorekeeping system that allows the game officials in combination with a performance content generation system that comprises an object tracking system, to perform all official scorekeeping tasks including at least the operation of the game clock and the entry of shots, goals and penalties information—thus providing the option of eliminating the traditional scorekeeper.

The objects and advantages of the present invention further include providing apparatus and data translations methods for receiving human and machine observations from the combination of a scorekeeping system and a performance content generation system as related at least to a sports performances such as a game, and then automatically determining when and which connected entertainment devices should be commanded to take which specific actions; where the entertainment devices at least include music and announcement systems, video displays, scoring indication lamps, primary arena lighting systems, laser show and secondary lighting systems as well as dynamic advertising display boards.

And finally, the objects and advantages of the present invention include the implementation of the preferred automatic entertainment processor using the prior taught session processor and its various features.

As will be apparent to those familiar with the various marketplaces and technologies discussed herein, portions of the present invention are useful individually or in lesser combinations than the entire scope of the aforementioned objects and advantages. Furthermore, while the apparatus and methods are exemplified with respect to the sport of ice hockey, as will be obvious to the skilled reader, there are no restrictions on the application of the present teachings, whether to other sports, music, theatre, education, security, business, etc., and in general to any ongoing measurable activities, real, virtual, abstract, animate or inanimate, without limitation. The lack of a need or use in other such applications for a scorekeeping system does not reduce the benefits provided by a using a performance content generation system in combination with an automatic entertainment system.

Still further objects and advantages of the present invention will become apparent from a consideration of the drawings and ensuing description.

DESCRIPTION OF THE DRAWINGS

FIG. 3a shows a high level block diagram of the present invention's teaching for integrating the external scorekeeping system directly with the scoreboard (that is normally controlled by the scoreboard manufacturer's console.) The integration is handled through a universal scoreboard interface combining both a novel digital circuit and software. The interface includes both a training mode for learning the manufacturer's control signals as well as a live mode for mimicking those signals in order to operate the scoreboard, or simply a live mode capable of driving a scoreboard without prior training.

FIG. 3b is a high level block diagram that improves upon FIG. 3a by shifting the job of operating the game clock to a combination of the referee and the object tracking system, while also shifting the job for entering the official scoresheet to the referee. This preferred embodiment of the scorekeeping system eliminates the scorekeeper's job, thus providing for a fully automatic scorekeeping system (outside of the session participants such as the referee.) Also depicted is the teaching that allows (optional) human observations of game activities to be made remote from the scorekeeper's booth and independently of the operation of both the scoreboard and the entering of official scorekeeping data—functions that are traditionally all bundled together as the scorekeeper's job shown in FIG. 3a.

FIG. 7c is a table showing the preferred data format of a universal action command.

FIG. 7d is a table showing exemplary entertainment device types, their general purposes along with potential data sources and example data outputs.

The following FIGS. 8a through 8d are all taken directly from the present inventor's prior related application entitled SESSION AUTOMATED RECORDING TOGETHER WITH RULES BASED INDEXING, ANALYSIS AND EXPRESSION OF CONTENT (SARTRIA) with one new teaching shown in FIG. 8d. Collectively, these figures will show that the prior taught (and herein depicted) "session processor" may alternately or additionally be used as the herein depicted automatic entertainment system processor.

FIG. 8a was taken from the original SARTRIA FIG. 7 and gives an overview of the flow and subsequent processing of information; starting with the differentiation of external observation marks followed by their integration into events, synthesis into summary and tertiary marks (internal observations) and finally the expression of combinations of this collected internal session knowledge into various usable data. The steps of integration, synthesis and expression were preferably conducted by the session processor. As will be discussed, this same session processor using its original construction with one modification (depicted in relation to FIG. 8d) can perform the desired functions herein taught for the automatic entertainment system.

FIG. 8b was taken from the original SARTRIA FIG. 24a and is a node diagram showing the associations between a create, start and stop mark (observation) and an event, each governed by a rule, all of which is pertinent to the step of integration. As will be discussed, event types may be used to represent individual automatic entertainment device types such that individual event type instances may then also serve to represent individual entertainment devices and their current device states. It will also be shown that the rules governing this step of integration are adequate to serve as the herein taught external trigger rules for controlling the activation and deactivation of individual entertainment devices.

FIG. 8c was taken from the original SARTRIA FIG. 31 and is a combination node diagram with a corresponding block diagram detailing the relationship between the mark and event objects for creating and specifying "tertiary" ("calculation") marks. As will be herein taught, these same tertiary marks may be used to represent universal action commands for controlling the automatic entertainment devices.

FIG. 8d was taken from the original SARTRIA FIG. 33 and is a combination node diagram with a corresponding block diagram detailing a special type of rule called a "descriptor," originally used for event naming. As will be herein taught, these same descriptor rules may be additionally linked to the related datum of (primary, secondary or) tertiary marks. This connection is established in template form by associating a descriptor rule stack to a context datum (which itself is related to a mark—see FIG. 8c.) By so doing, these same prior taught descriptor rules are equally useful for creating official announcement text, game commentary data streams and database SQL select statements, all of which are important features of the preferred universal action command.

Figure 1:
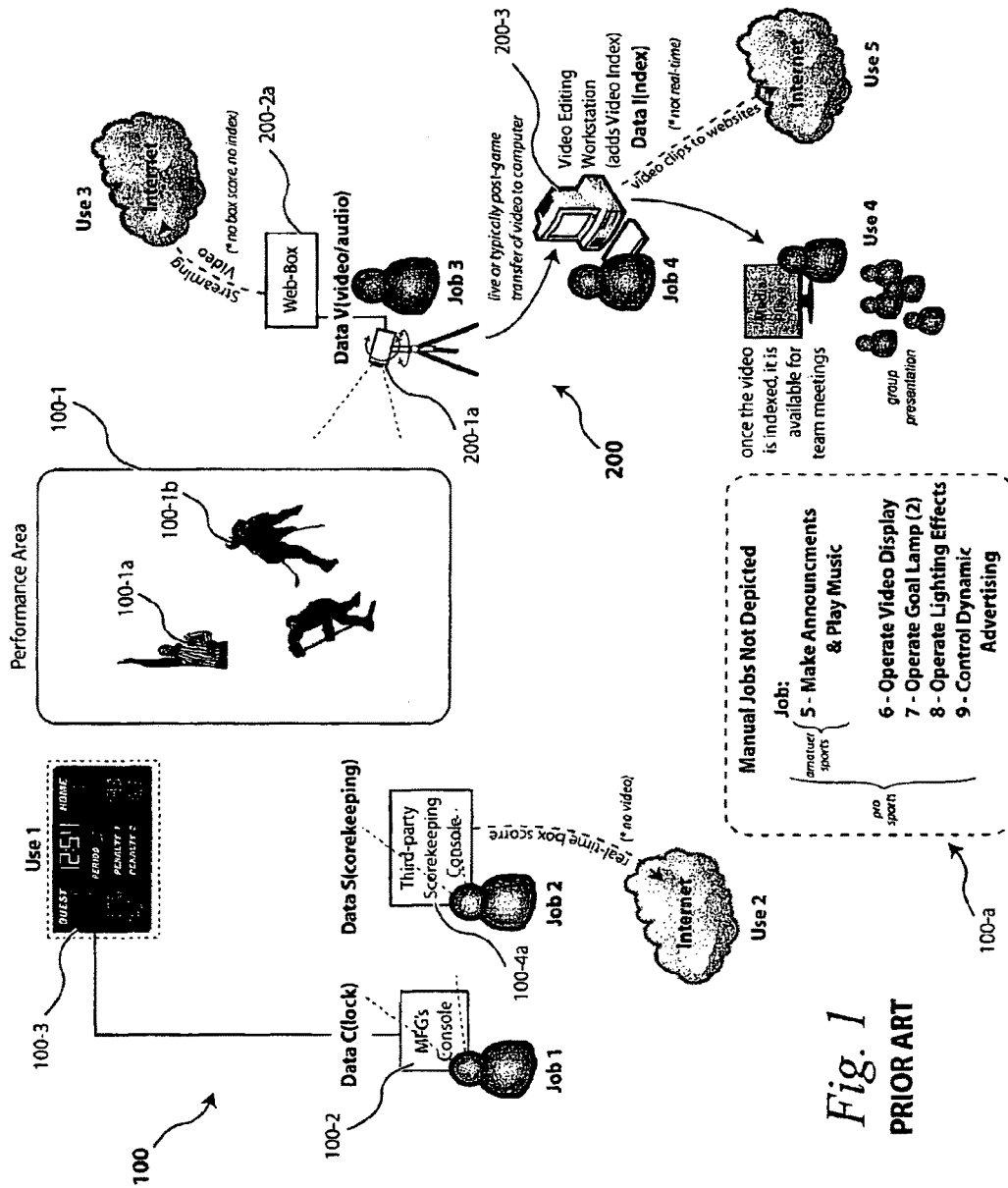
FIG. 1 depicts the current state-of-the-art in youth scorekeeping systems, especially as they relate to the sport of ice hockey and without consideration of other recent advancements already taught by the present inventors in prior related patents and applications. The focus of the figure is the number of manual jobs that must be performed and the uses for the data being created by those jobs.

Specification:

Referring to FIG. 1 (Prior Art) there is depicted the current state-of-the-art sports scorekeeping system as it applies to youth ice hockey. As will be understood by those familiar with sports in general, the arrangements and depictions in FIG. 1 and therefore carried into the remaining figures are directly applicable (with minor variations) to at least all teams sports, especially those that include a scoreboard display. Therefore, while the present invention is described in relation to the sport of ice hockey, this choice of exemplification should not be construed as a limitation. As will be understood by those skilled in the various arts supporting the herein teachings, the present embodiments as they apply to the integrated scoreboard have applicability to sports in general and also have uses beyond sports, such as in any setting including a performance, an audience and an electronic display. Likewise, the herein teachings as they apply to any one or more aspects of the automatic entertainment system also apply to sports in general as well as any setting including activities where the people conducting the activities and/or watching the activities desire to receive the types of information so provided.

Still referring to FIG. 1, the arrangement depicted includes a performance area 100-1 where players such as 100-1b interact while game officials such as 100-1a who make judgments and have effect over the starting and stopping of game play. Also shown is a scoreboard 100-3 used to post information regarding the performance along with a scoreboard console 100-2, typically provided by the scoreboard manufacturer, to control the displayed values (data use 1) on the scoreboard 100-3 (herein referred to as "job 1".) (Note that example scoreboard and console manufacturers would include Daktronics, Fair-play, Varsity Scoreboards and several others.) While most youth sporting events still keep the official box score on paper as the game is played, the current state-of-the-art includes electronic scorekeeping systems 100-4a that are typically provided by some third-party manufacturer (e.g. Pointstreak.) Scorekeeping systems 100-4a such as provided by Pointstreak do not integrate with the manufacturer's console or scoreboard, either for the purposes of getting or giving information, but rather serve to record official box score information in real-time (herein referred to as "job 2",) which is then also ideally posted to one or more web-sites on the internet (data use 2.) Altogether, the combination of performance area 100-1, console 100-2, scoreboard 100-3 and scorekeeping console 100-4a form official scorekeeping system 100.

Also depicted in FIG. 1 is video camera tripod combination 200-1a operated manually as "job 3" for the recording of the game activities. Service providers such as Fast Hockey or B2TV provide web-boxes 2002a which can directly accept the video stream from camera 200-1a for streaming onto the internet (data use 3.) Note that these service providers and their web-boxes 200-2a only provide manually controlled video and do not also interact with the scorekeeping console 100-4a or the scoreboard 100-3 and its console 100-2, such as would be necessary for obtaining useful game time and box score information for graphically overlaying onto the video. A separate job 4 is also shown where an operator using video editing workstation 200-3 creates a video index for the video and otherwise performs clipping and assembly as will be understood by those familiar with sports editing software such as provided by XOS Tech, StevaSports, Gamebreaker and many others. The data created by this job 4 is typically made available to the team for group presentations (data use 4) or provided over the web for general public viewing (data use 5.) Altogether, the combination of camera tripod combination 200-1, web-box 200-2a and video editing workstation 200-3 form performance content generation system 200.

Figure 5:
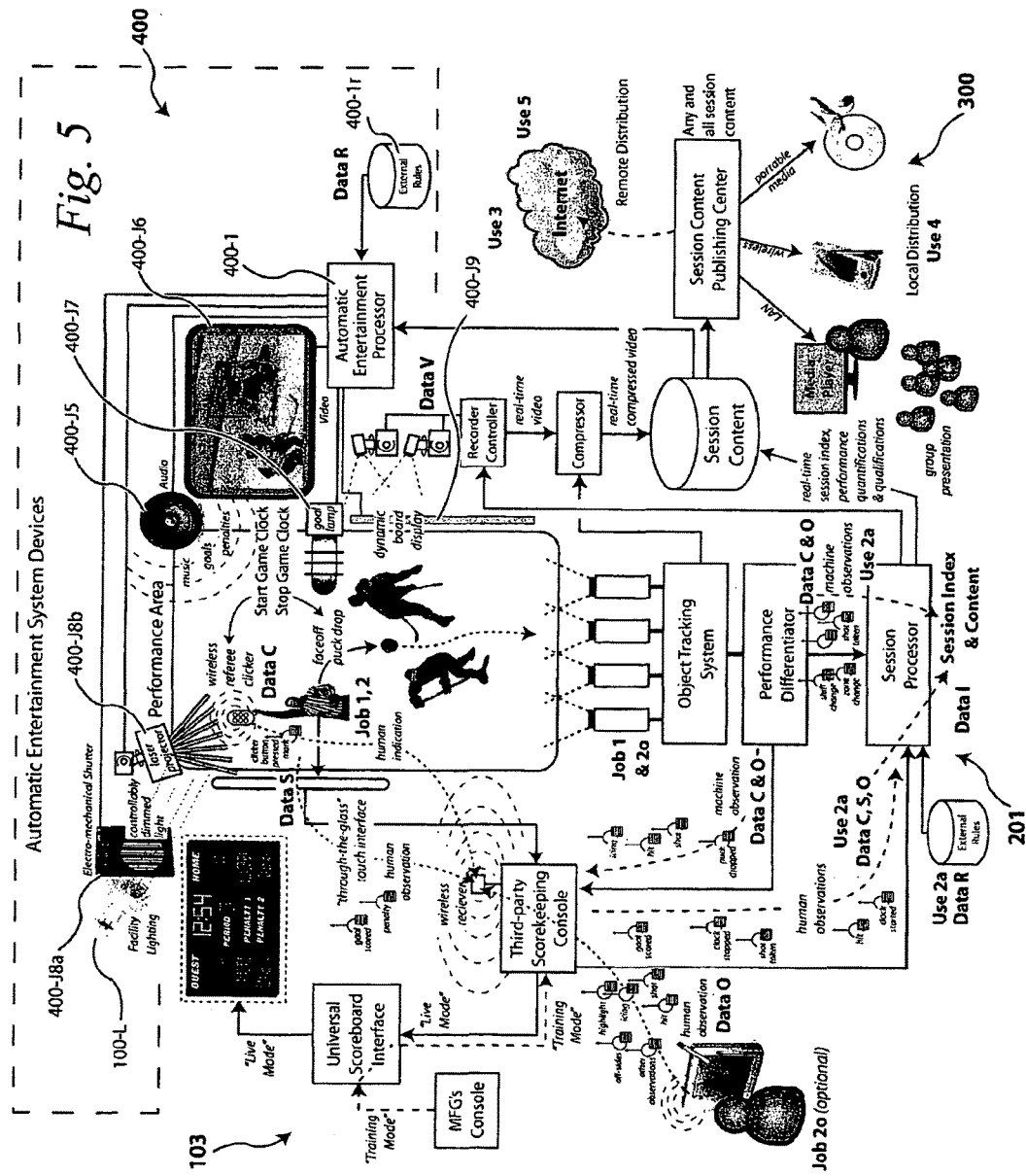
FIG. 5 depicts all of the combined teachings shown in FIG. 4 with the inclusion of additional teachings for an automatic entertainment system driven by the session content comprising information from both the scorekeeping system and the performance content generation system. This automatic entertainment system address several other manual jobs listed in FIG. 1 but not depicted, including making audio announcements and operating the music system, choosing and driving the video display, operating the goal lamps and creating various lighting effects by dimming the venue lighting while also operating a laser projector.

And finally, also depicted in FIG. 1 is a list of the other "Manual Jobs Not Depicted" 100-a in addition to Jobs 1 through Job 4 that might be performed at either a youth sporting event (such as Job 5 to make official scorekeeping announcements and operate the music system,) or at a professional event (such as Job 6 to operate a video display for example to show instant replays of game action, Job 7 to operate a goal lamp as is typical in ice hockey to indicate that either a home or away goal was scored, Job 8 to dim venue lighting and/or generate a laser light show to build crowd excitement and Job 9 for controlling the content and effects used by a dynamic advertising system—all of which will be discussed in more detail with respect to upcoming FIG. 5.)

Figure 2:
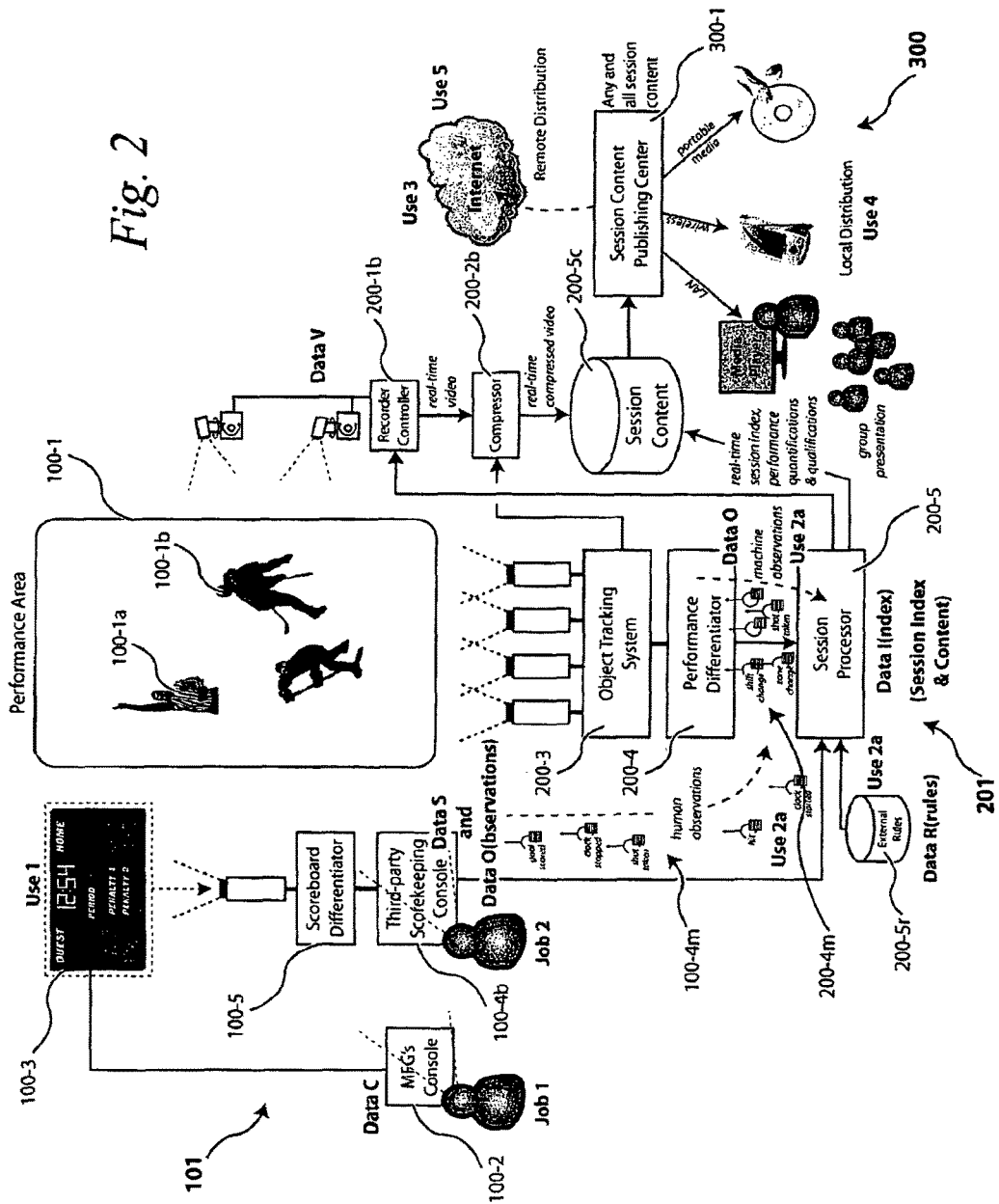
FIG. 2 depicts the current state-of-the-art shown in FIG. 1 in combination with additional teachings of the present inventor from prior patents and applications. Using these teachings, which include an object tracking system for observing the game and an external rules-based session processor for combining the game data into a session index, the overall system eliminates two jobs while still increasing in data (session content.)

Referring next to FIG. 2 (Prior Art), the current state-of-the-art arrangements first depicted in FIG. 1 are now augmented to include the improvements already taught by the present inventor in past related patents and pending applications. Specifically, the official scorekeeping system 100 of FIG. 1 has been upgraded to system 101 in FIG. 2 and now includes scoreboard differentiator 100-5 for remotely capturing the face of scoreboard 100-3 with a video camera, whereupon the images are then analyzed (differentiated) in real-time in order to ascertain the Data C (Use 1) therein contained. Hence, the data entered via scoreboard controlling console 100-2 as Job 1 is transmitted for display on scoreboard 100-3 at least including the state of the game clock (Data C.) By using a camera to remotely detect the current state of scoreboard 100-3, the scoreboard differentiator 100-5 at least informs the upgraded third-party scorekeeping console 100-4b of the changes in game-state from "in-play" to "out-of-play," which in turn are useful for automatically alternating the data entry screens used to prompt the operator performing the scorekeeping Job 2. Many other important functions for this Use 1 Data C were also prior taught, such as always knowing the current period and game time which is critical for the creation of a real-time game index. (Note that in the prior related applications, a direct link was also discussed whereby the scorekeeping system 100-4b could receive digital information as generated by the scoreboard console 100-2 equivalent fully or in-part to that information determined remotely by differentiator 100-5 via scoreboard 100-3. The advantages of using the remote differentiator 100-5 are its remote aspect as well as its inherent independence from the scoreboard manufacturer's system—all of which was fully discussed in the prior applications and will be well understood by a careful reading of those teachings.)

Still referring to FIG. 2 and also as already taught in the present inventor's related applications, camera and tripod combination 200-1a has been replaced by camera and electromechanical pan-tilt device with controller 200-1b while web-box 200-2a for converting video has been replaced by compressor 200-2b. Furthermore, performance area 100-1 is now shown to be in the constant view of object tracking system 200-3 that employs multiple fixed cameras with associated machine vision to follow the activities of players such as 100-1b and game officials such as 100-1a. These tracked activity motions are then preferably passed to performance differentiator 200-4 that is responsible for determining when selected activities exceed one or more threshold conditions, thus resulting in the issuing of "machine observations" 200-4m as timeline "marks" with "related data." Such observations might include "shift change," "zone change," "shot taken," etc. Also fully taught in prior issued patents from the present inventor is that the activity (object motion) information generated by the object tracking system may be used in real-time to operate the pan, tilt and/or zoom aspects of any one or more side-view perspective cameras, such as 200-1b—thus eliminating Job 3 of operating the camera and tripod 200-1a.

Upgraded scorekeeping console 104-b of FIG. 2 is also now capable of issuing "human observations" 1004m as made by the scorekeeper performing Job 2 in the same prior taught and preferred (but not necessary) "mark" plus "related data" protocol for packaging machine observations, such as those generated by performance differentiator 200-4. Human observations made by the scorekeeper in combination with the scoreboard differentiator 100-5 (and thus technically a machine observation) might include "clock started," "hit," "shot taken," "clock stopped," "goal scored," etc. The real-time observation streams of 100-4m and 200-4m are then preferably made available to a session processor 200-5, where processor 200-5 uses pre-established external rules 200-Sr to control the translation of all observation streams such as 100-4m and 200-4m into a session index and other content for storage in session content database 200-5c. As previously mentioned, all of this has been taught in detail by the present inventors in prior related applications including that this translation of the human and machine observation "marks" into performance "events" forms a natural "session index," which in turn is relatable in real-time to all captured video (and audio) content coming from either the object tracking system 200-3's fixed cameras, or the automated cameras 200-1b.

In summary, current state-of-the-art official scorekeeping system 100 and performance content generation system 200 depicted in FIG. 1 have now been upgraded to scorekeeping system 101 and content generation system 201 using the teachings of the present inventor from prior related applications. This combination of official scorekeeping system 101 and performance content generation system 201 acts to eliminate the need for the video editing workstation 200-3 and its operator performing Job 4. Thus the arrangement of current state-of-the-art devices shown in FIG. 1 are seen to require at least 4 operators performing: Job 1 to operate the scoreboard and clock forming Data C, Job 2 to operate the third-party scorekeeping device 100-4a forming Data S, Job 3 to operate the camera and tripod combination 200-1a forming Data V and Job 4 to operate the video editing workstation forming Data I. As shown in FIG. 2, by employing the enhancements prior taught by the present inventors, both Jobs 3 and 4 can be fully automated, thus greatly enhancing at least Uses 3, 4 and 5.

Still referring to FIG. 2, at least video (with optionally captured audio) content Data V and session index content Data I are output to session content database 200-5c. Preferably, also output to database 2005c are codifications of scorekeeping (box score) Data S and scorekeeper observation Data 0—the codification by session processor 200-5 of which was a subject of prior related applications (and not necessary for the novel teachings of the present invention.) Also depicted in FIG. 2 is session content publishing center 300-1 that either automatically or with input from operators or purchasers, distributes any and all session content such as Data V, I, C and S either locally or remotely (altogether referred to as session content publishing system 300.)

Referring next to FIG. 3a, the new teachings of the present invention begin with the addition the first embodiment of a universal scoreboard interface 100-6 module to the official scorekeeping system 101 of FIG. 2. The overall purpose of this interface 100-6 is to shift the control of the scoreboard 100-3 from the manufacturer's console 100-2 to the third-party scorekeeping console, now upgraded to 100-4c. In prior scorekeeping console 100-4a of FIG. 1, the device was simply used to record the box score and official scorekeeping information as communicated by the game officials 100-1a to the console operator performing scorekeeping job 2. Console 100-4a had no automatic interaction with the scoreboard 100-3 or its console 100-2. In scorekeeping console 100-4b, the scoreboard 100-3 is still controlled by its console 100-2, but it could at least assist in the scorekeeping job 2 by remotely transmitting data to scorekeeping console 100-4b via the scoreboard differentiator 100-5. As was previously mentioned, the present inventors have also anticipated in prior applications and herein, that manufacturer's console 100-2 could provide via direct connection (i.e. not through the scoreboard 100-3) at least the same information to scorekeeping console 100-4b as determined by differentiator 100-5. The main point is that scorekeeping console 100-4b is fundamentally different from is earlier versions 100-4a because it receives and uses information generated by the manufacturer's scorekeeping system (i.e. console 100-2 in combination with scoreboard 100-3) in a novel and beneficial way for the benefit of the scorekeeper.

Still referring to FIG. 3a, what is different about official scorekeeping system 102 versus system 101 portrayed in FIG. 2 is that system 102 uses scorekeeping console 100-4c that is now driving the data displayed on scoreboard 100-3—as opposed to responding to the data, which was the case with scorekeeping console 100-b. As will be understood by those skilled in the art of scoreboard systems, this is a fundamental shift that has significant benefits for the scorekeeper, ultimately leading to the potential for shifting the main game-time data entry to the game officials as will be discussed shortly in reference to upcoming FIG. 3b. In order to accomplish this shift, it is necessary to have an apparatus for connecting scorekeeping console 100-4c to scoreboard 100-3, either directly or through scoreboard console 100-2, which is the purpose and one of the two main functions of universal scoreboard interface 100-6. (As will be well understood by those familiar with hardware and computer systems, the universal scoreboard interface 100-6 could just as well be integrated into the scorekeeping console 100-4c rather than being external to it. Thus the physical relationship between the scorekeeping console 100-4c, the universal interface 100-6 and even the scoreboard 100-3 is immaterial to the teachings herein and should not be construed as a limitation thereof.)

Regarding the functions of the first embodiment of interface 100-6, there are two. The first is to connect the manufacturer's console 100-2 to the scorekeeping console 100-4c (or its equivalent proxy, such as a PC) running the necessary "training mode" software. As will be discussed further in relation to FIG. 6a, this training mode connection is ideally made at either of two distinct junctures points "A" or "B," where A is the point inside scoreboard console 100-2 between its keyboard and internal processor and B is the point outside console 100-2 where it is connectable to the scoreboard 100-3. Regardless of the connection point A or B, in this training mode, what is most important is to operate manufacturer's console 100-2 over a sufficiently exemplary set of its possible inputs (via its keypad) while simultaneously recording all signals generated by console 100-2 in response.

As will be understood by those familiar with such scorekeeping systems, the keypad inputs and corresponding commands would typically be: "set main clock to 99:99," "set home goal to 9," "start clock," "stop clock," "set away penalty 1 to player 99, time 2:00," etc. In training mode, as the operator runs through this sufficient set of exemplary commands, the universal scoreboard interface 100-6 transmits the signals it receives within or from the manufacturer's console 100-2 to the scorekeeping console 100-4c (or its proxy.) During this transmission, it is further taught that the signals themselves will be converted from the original signal format used by manufacturer's console 100-2, into a digital signal format more readily useful to a typical PC. For instance, via juncture B the manufacturer's console 100-2 is typically using a current-loop with embedded digital data as a transmission signal to scoreboard 100-3, whereas the ideal input to the scorekeeping console (PC) 100-4c is serial data—all of which will be well understood by those familiar with both electrical engineering in general, and these manufacturer's scorekeeping systems in particular. These teachings will also be reviewed in greater detail with respect to upcoming FIG. 6a.

In reference to FIG. 3a and training mode, what is currently most important is to understand that the function of the first embodiment of a universal scoreboard interface 100-6 is to receive output signals from the manufacturer's console 100-2 in its native electrical format and then to translate this same signal into preferably a serial data format for transmission to a typical PC without otherwise disturbing the underlying (typically digitally encoded) information. It is also important to understand that the method of operation of the universal scoreboard interface 100-6 in training mode is to receive, translate and transmit each specific set of output signals in distinct relation to specific corresponding sets of exemplary keypad inputs to manufacturer's console 100-2. As will be understood by those skilled in software and information systems, in its training mode the universal scoreboard interface 100-6 is acting as a means for mapping the distinct signal sets issued by the manufacturer's console 100-2 (from either juncture A or B) resulting from the exemplary job 1 keypad entries, with the corresponding functions being accomplished by those same entries, e.g. "start clock," "increment home goal count."

Still referring to FIG. 3a, once the third-party scorekeeping console 100-4c has been sufficiently trained regarding the exact manufacturer's console 100-2 signals generated at either juncture A or B to effect the exemplary scoreboard changes, then the universal scoreboard interface 100-6 may be used in somewhat of a reverse manner during "live mode." In live mode, the interface 100-6 connects the scorekeeping console 100-4c back through juncture A or B to the scoreboard 100-3. As was prior discussed, the scorekeeping console 100-4c is now fundamentally different in that it is the source of all official scorekeeping information (as opposed to simply recording it,) most especially including the game clock state, which used to be maintained in the scoreboard manufacturer's console 100-2. As the source of information, while this information changes (e.g. a goal is scored, a penalty transpires, the game starts and stops, etc.,) it is necessary that the scorekeeper's console 100-4c transmit this information to the scoreboard 100-3 (directly through juncture B or indirectly through juncture A within the scoreboard console 100-2) in a signal format exactly similar to the scoreboard manufacturer's console 100-2—thus mimicking console 100-2 and accomplishing use 1 of at least the clock data as well as some of the scoresheet data. (Again, more details for this teaching will be provided in relation to upcoming FIG. 6a and then also for a second embodiment in FIG. 6b, and finally the actual circuit board layout for implementing the second embodiment will be shown in FIG. 6c.)

As will also be understood by those skilled in both electrical engineering and in device manufacturing, there are significant tradeoffs for using juncture A versus B. For instance, while the keypad signals (juncture A) tend to be less sophisticated to mimic (as opposed to the scoreboard signals (juncture B) directly sent from the scoreboard console 100-2 to the scoreboard 100-3,) physically connecting the universal interface 100-6 to the portion of the scoreboard console 100-2 that accepts its keypad signals requires opening the console 100-2 and making a separate internal connection. Based at least upon the compactness of the scoreboard console's 100-2 internal design, this can be problematic. In practice, there also tends to be a greater variation in the way keypads are internally connected to the console's 100-2 main motherboard than there are variations between the way any given console 100-2 connects from its external port to a input port on the matching scoreboard 100-3. (This is especially true within a single manufacture's full line of scoreboard's 100-3 and their accompanying console's 100-2 that all tend to transmit the same signal format between each other via external connections while the console's themselves have distinctly different keypads, different internal console designs and different internal connectors between their keypads and their console 100-2 motherboards.) Thus, regarding the first embodiment of the universal interface 100-6, it is preferred that the signals learned in training mode and mimicked in live mode are those normally output by the scorekeeper's console 100-2 for direct input to their scoreboard 100-3 (as essentially depicted by the "training" and "live mode" signal-path arrangements shown in FIG. 3a.)

However, as will be discussed in detail with relation to FIG. 6b, it is possible to implement a second embodiment of the universal scoreboard interface 100-6 that still (and only) interfaces through juncture B, but no longer requires a separate training mode. It is this embodiment that the present inventors have implemented, for which the actual circuit layout is shown in FIG. 6c.

Figure 3:
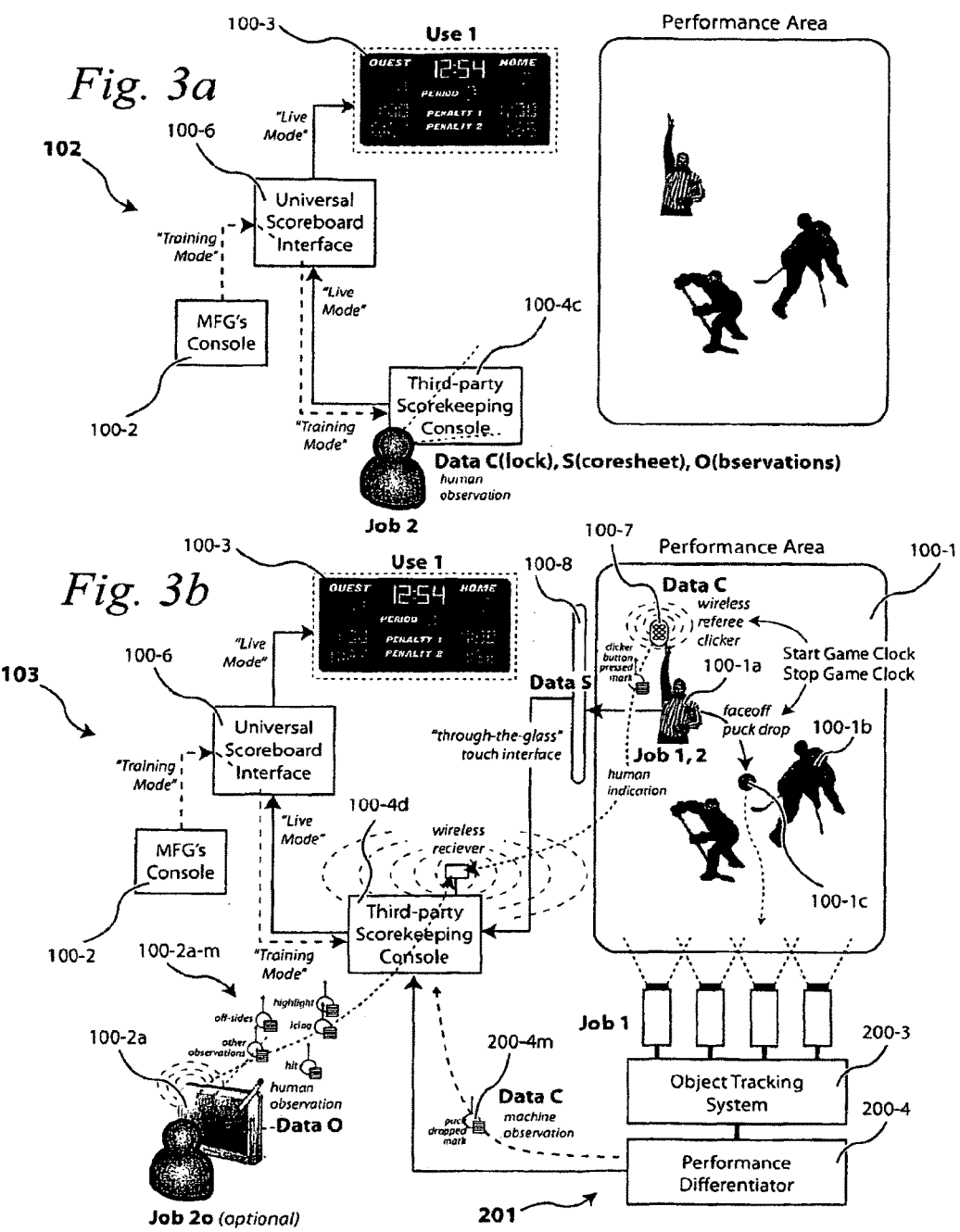

As will be appreciated by those familiar with scorekeeping systems in general, the major benefit of using the official scorekeeping system 102 of FIG. 3 rather than systems 101 or 100, is that the job 1 of operating the manufacturer's console 100-2 during a live game has been eliminated.

Referring next to FIG. 3b, official scorekeeping system 102 has now been further upgraded to system 103 where the job 2 of entering clock and official scorekeeping data has been shifted from the scorekeeper to the game official 100-1a in combination with the object tracking system 200-3. To accomplish this new preferred functionality, the third-party scorekeeping system is now also upgraded to 100-4d such that it includes a wired connection to "through-the-glass" touch interface 100-8 and a wireless connection to both referee clicker 100-7 and optional game observation entry device 100-2a. Note that like scorekeeping device 100-4b of FIG. 2, upgraded device 100-4c also includes a critical connection to performance differentiator 200-4.

Still referring to FIG. 3b, and specifically to how the various new parts of scorekeeping system 103 work together to control the scoreboard 100-3, there are two key functions to consider. First, how does the system start and stop the scoreboard 100-3 clock without a scorekeeper effectively controlling the scoreboard 100-3 via the scorekeeping console 100-4c? Within ice hockey, the clock is started under a strict set of rules including:

1. The game must be in an official period;
2. The clock must be currently stopped;
3. The player's must be aligned for a face-off, and
4. The referee must drop the puck in the middle of this alignment.

The data states supporting rules 1 and 2 are easily known to the system by scorekeeping console 100-4d as would be obvious. As will be understood by those skilled in the art of machine vision systems, the present inventors prior art teachings for a camera based object tracking system 200-3 provide at least one sufficient way of detecting the data states supporting rules 3 and 4. It is not the purpose of the present invention to teach the necessary image analysis algorithms for determining current object (i.e. player and puck) locations and then subsequent object movement (as the face-off begins,) especially since the underlying algorithms are already fairly well understood in the art. What is important is that this data is collected by the object tracking system 200-3 and ultimately passed to the scorekeeping console 100-4d. (Note that there is also no restriction for the purposes of the present invention that the object tracking system 200-3 be implemented with cameras and machine vision— this is only the present inventor's preference. For instance, as discussed in prior applications, use of RF or IR systems is also acceptable for tracking at least 2D player and puck locations, the location of which themselves are sufficient for evaluating rules 3 and 4. Furthermore, for the purposes of the present invention it is not a requirement that the object tracking system 200-3 include a separate performance differentiator 200-4. The system works equally well if the object tracking system 200-3 provides the required data directly to the scorekeeping console 100-4d which does its own differentiation, or includes an embedded differentiator; all as will be well understood by those familiar with various software systems and architectures.)

Still referring to FIG. 3b, after the system uses performance content generation system 201 to determine the "puck drop" game state transition, the appropriate observation mark 200-4m (or some equivalent) is transmitted to scorekeeping console 100-4d that in turn initiates its own internal game clock. As this virtual clock is initiated, its changing information is automatically conveyed through the universal scoreboard interface 100-6 to the scoreboard 100-3. It is noted that typically the scoreboard 100-3 itself does not include an internal clock that is turned on and off, but rather is simply used to display the cell values of the official clock traditionally maintained in the manufacturer's console 100-2 and now maintained in the scorekeeper's console 100-4d.

As will be obvious to those skilled in the various sports, only ice-hockey starts its official scoreboard clock based upon the dropping of a puck. Some sports (like baseball) don't have an official clock in the same sense of limiting the overall time of play. Other sports such as basketball start the clock when their game object (i.e. the basketball) is thrown in the air by the game official while in still other sports like football the clock is started when the game official blows their whistle. For the purposes of the present invention, the particular method is immaterial. Again, what is important is that this "start clock" state is detected preferably by direct machine observation (or some other object tracking technology) and/or by allowing the game official to so indicate using a wireless clicker 100-1a or some equivalent (such as blowing a whistle to activate either an airflow detector or a sound receiver, both methods of which have been taught in the prior art.)

Once the game clock is started, and still referring to FIG. 3b, in the sport of ice hockey (and several others) the clock is stopped when the game official 100-1a blows his whistle. While the present inventor has already taught a whistle capable of detecting air-flow through its inner chamber as a means of determining the point of whistle blowing, and other inventors have taught systems for detecting the sound created by the whistle blowing, it is herein preferred that the game officials 100-1a be given wireless clickers 100-7. Regardless of the detection apparatus and method, once the game official indicates that the clock should be stopped, at least using the present wireless clicker 100-7 the scorekeeping console 100-4d receives this "stop clock" signal via its wireless receiver. Similar to the processing of the clock start signal, once received console 100-4d stops its internal virtual clock which is then automatically reflected on scoreboard 100-3 via interface 100-6. The present inventors also make note that the sound of the whistle is an important audible cue, not just to the scoreboard console operator to stop the clock, but also to the players to stop their activities. For this reason, the present herein teach that the integrated automatic entertainment system to be discussed in relation to upcoming FIGS. 5, 7a and 7b, which among other things controls the venue sound system, is to be signaled to generate a whistle-like or equivalently recognizable "stop play" sound.

While the scorekeeping system 103 of FIG. 3b is shown to be able to start and stop the game clock without the need of a scorekeeper, the next data that must be addressed to fully eliminate this same scorekeeper at least includes the official entry of goals and penalties. While the current practice in ice hockey is that the game official 100-1a skates over to the scorekeeper and verbally indicates this information for data entry, the present inventors prefer allowing the game official 100-1a to enter this information by themselves. Past inventors have taught a small data entry pad worn by the referee around their wrist or forearm with a wireless connection to the scorekeeping console. While this solution is perfectly acceptable for the purposes of combining with the present invention's start/stop detection (i.e. to eliminate the need of a separate scorekeeper,) the present inventors prefer not requiring the referees to wear any equipment that may hurt them or get damaged in the case of a fall.

There are presently several variations in the marketplace of a new technology branded as "though-the-glass" touch input screens, such as those provided by PointandPress, VisualPlanet, iWindow and others. The actual manufacturer or underlying technology is not important to the present invention. What is important is that using any of these devices the referee may enter official game information directly without the need for a separate scorekeeper. Especially for the unique sport of ice hockey that surrounds its performance area with boards and glass, any of the "through-the-glass" input screens would therefore be mounted on the "outside" of the glass opposing both the game official 100-1a and more importantly the game action. Furthermore, all of these devices have solutions that work through the thicker glass used in ice hockey and all can produce screens of sufficient size to make entering the limited information of goals and penalties simple for the official 100-1a. As will be understood by those familiar with software systems, what is being accomplished is that the data entry screens typically used by the scorekeeper via console 100-4c are now be presented to the game official 100-1*a* via the through-the-glass mounted data entry screen. Once the official Data S is entered, it is then used by scorekeeping console 100-4*c* to update its internal virtual scoreboard at which point the same Data S is output to scoreboard 100-3 via universal interface 100-6, also referred to as "use 1." Scorekeeping console 100-4*c* further transmits this same official Data S as observation marks 100-4*m* (or some equivalent) to session processor 200-5 (as depicted in FIG. 2.)

As will be obvious to those skilled in the sport of ice hockey, there is some minor additional scorekeeping data beyond goal entry and penalty entry that also needs to be taken care of by the game official 100-1*a* using this preferred approach. This Data S includes penalty shots, overtime periods and shootouts but does not need to include the entry of rosters, team names and dates. This later set of information will be pre-known to the scorekeeping system via its integration with a companion scheduling system, all as taught by the present inventors in prior pending applications and not material to the present teachings. The present inventors also make note that the object tracking system 200-3 and the performance differentiator 200-4 will be able to assist the game official with some of the data entry, at least including the jersey numbers and names of all current players (by team) on the ice, thus making a short list to pick from when entering goals and penalties. Beyond this, the present inventors also anticipate that the differentiator 200-4 will be able to detect players entering the penalty box as well as players scoring goals and providing assists, all of which can be used to simplify the required data entry. Regardless of the amount of assistance provided, the present invention offers the opportunity of eliminating the now separate job of scorekeeping by both automatically detecting the clock start/stop transition points as well as accepting scorekeeping data directly from the game official 100-1*a*.

And finally, still referring to FIG. 3*b*, in the lower left hand corner an operator is depicted using game observation entry device 100-2*a* to perform new optional "Job 2*o*." As will be understood by those familiar with sports, there is a significant amount of additional "non-official" information that is still very desirable to collect in real-time synchronization with all other clock and scorekeeping data. For ice hockey, these other "observations" might include: "hits," "icing," "off-sides," "highlights," etc. What is preferred by the present inventors is that this information may be entered remotely by virtually any observer using some networked device ranging from a tablet PC (connected via a private local wireless network) to a cell phone (connected via an internet web-page.) Regardless of the device used or method of connection, what is herein taught is that the non-official, yet important other observations (Data 0) are optionally enterable by one or more observers remotely (from the scorer's booth) and distinctly from the clock (Data C) and scorekeeping (Data S). These devices implementing 100-2*a* also preferably, but not necessarily, provide their information in the standard observation mark 100-2*a-m* protocol used by all other machine or human observation collecting devices within the present system.

As will be well understood by those familiar with software systems, the novel teaching of the present invention should not be limited by the choice of information exchange formats or data transport mechanisms between the various system parts. In prior applications, the present inventors taught and claim the benefits of establishing a universal protocol and methodology for collecting human and machine observations from a disparate range of devices to be collectively processed by a session processor. Such a universal approach allows for significant scaling of data collection devices as the marketplace adopts a single standard for session content codification. This prior taught protocol extended beyond the observation marks to include their processing into session events under the control of externally provided rules. While these prior teachings of "marks, events and rules" are incorporated in the present specification and especially in relation to FIGS. 7*a*, 8*a*, 8*b*, 8*c* and 8*d* they are not necessary for the herein taught and claimed novel apparatus and methods, and should not be taken as limitations.

Figure 4:
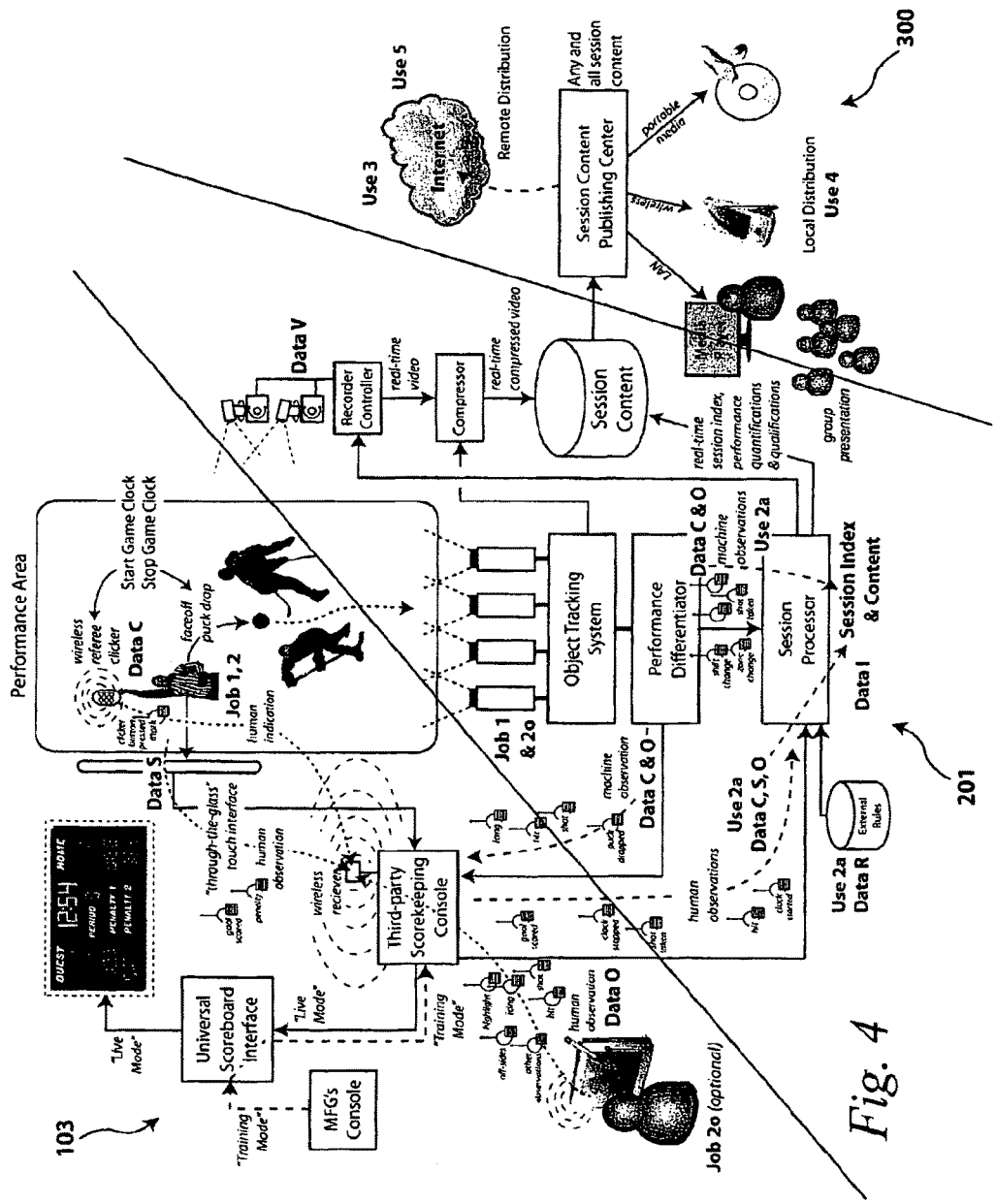
FIG. 4 depicts a combination of the state-of-the-art along with the present inventor's prior improvement shown in FIG. 2, as well as the new improvements shown in FIGS. 3a and 3b. The net result over the current state-of-the-art shown in FIG. 1 is the removal of all mandatory jobs while at least maintaining traditional clock, scorekeeping and video/audio data, as well as their traditional uses.

Referring next to FIG. 4, the entire combination of preferred official scorekeeping system 103, performance content generation system 201 and content publishing system 300 is depicted in together as a single system without any additional new teachings.

Referring next to FIG. 5, there are shown systems 103, 201 and 300, exactly the same as in FIG. 4, with the addition of automatic entertainment system 400. Similar to content publishing center 300-1, entertainment system processor 400-1 is driven in real-time by session content database 200-5*c* to be discussed in greater detail with respect to FIG. 7*a*. Similar to session processor 200-5, entertainment processor 400-1 employs external rules 400-1*r* to govern its automatic functions to be discussed in greater detail with respect to FIG. 7*b*.

Still referring to FIG. 5, the purpose of the automatic entertainment system 400 is to provide the other "manual jobs not depicted" 100-*a* as shown in FIG. 1 to a sporting venue in general, and in this example an ice hockey facility. In its most abstracted view, entertainment system 400 is responsible for either directly outputting portions of session content 200-5*c* via one or more devices, where this output is typically audible or visual, or effecting environmental changes in response to this same content 200-5*c*. In order to replicate the current manual jobs shown in 100-*a*, the entertainment devices taught in the present invention include:

Audio System 400-J5:
 For performing Job 5—making announcements and playing music;
Video Display 400-J6:
 For performing Job 6—operating the video display (e.g. showing replays);
Goal Lamp 400-J7:
 For performing Job 7—operating the goal lamps when a goal is scored;
  (particular to ice hockey, although other sports will play music or make a noise, which could be included with Job 5 above);
Electro-mechanical Shutter 400-J8*a*:
 For performing Job 8—operating lighting effects by dimming the facility lighting 100-L, especially in combination with,
Laser Projector 400-18*b*:
 For performing Job 8—operating lighting effects by projecting various laser patterns as a light show, especially effective when the facility lighting has already been dimmed, and
Dynamic Board Display 400-J9:
 For performing Job 9—controlling dynamic advertising during the game.

What is most important about automatic entertainment system 400 for most sporting applications is not any one of these devices, but rather the overall combination of such devices with at least an official scorekeeping system 100, 101, 102 or 103 in combination with a content generation system 200 or 201. Note that it is not necessary to have an associated content publishing system 300 to apply the teachings of the present invention regarding entertainment system 400. Furthermore, the present inventors anticipate that additional devices might be desirable for control by the entertainment system 400, especially for other sports and other non-sport applications—all as will be obvious to a skilled software systems engineer since an important novel aspect of system 400 is its universality and open protocols. (Examples of other possible entertainment devices include a "fogger" for creating fog over and around the performance area or multi-color LED lighting for both casting white light during normal performance activity and switching to colored lighting at appropriate non-activity times.) It is also noted that for some sports and other types of non-sporting events, where a scoreboard is not used or desirable, the present teachings for using some implementation of a performance content generation system 201 (ideally including some form of object tracking) for creating machine observations 200-4m, and optionally using human observers on remote data entry devices for creating human observations 100-4m, are still considered within the scope of the present invention.

Still referring to FIG. 5, the following list is provided of exemplary devices found in the marketplace today that could serve the herein taught purposes as entertainment devices:

Audio System 400-15:
  While many options exist, the present inventors prefer a class of systems known as "Public Announcement (PA) over IP" systems. Their common features include:
    Connectable via standard computer networking infrastructures (i.e. not centralized analog);
    Easily driven by commands from connected computer system;
    Works with pre-stored digitally recorded music;
    Works with text-to-speech or pre-recorded speech;
    Supports optional live audio announcements;
    Uses speakers with IP addresses capable of reproducing analog audio signals from the transmitted digital signals;
  Example providers include:
    Barix AG of Switzerland
    Kintronics Information Technology of NY, USA
    Stentofon Communications of Australia
Video Display 400-J6:
  Many reasonable options exist, while the present inventors prefer newer solutions such as:
    Public-display-grade, "TileMatrix" LCD displays such as the NEC V421 or V461. Each panel displays in 1080p hi-definition and up to 25 panels can be combined to form what is being referred to as a "video wall";
    Very large size displays such as the Panasonic 103" 1080p plasma, which also comes with a touch version making it ideal for interactive lobby use;
    LED Display modules from manufacturer's such as Toshiba, Barco, Lighthouse, Daktronics and Element Labs. These are basically smaller panels (often only 16" squares) that can be combined to make a custom shaped Video Walls that act as a single display screen, or
    SMD LED Display strips from manufacturer's such as PowerPro from China. These are single lightweight LED displays that can be manufactured into strips as large as 50 m×40 m.

Goal Lamp 400-J7:
  Many reasonable options exist, while the present inventors prefer an arrangement of one or more USB LED Visual Signal Indicators manufactured by Delcom Products, mounted behind the glass, behind each goalie within a transparent casing. Furthermore, using at least five signal Indicators in combination allows the system to automatically indicate the location of the goal (e.g. "1-hole, 2-hole . . . 5-hole" by turning on the matching number of lights.) This information is preferably determined automatically by the performance differentiator 200-4 as it analyzes the data collected by the object tracking system 200-3, all as will be fully understood by a careful reading of the present inventor's prior applications.
  The present inventors further anticipate that this same method of both indicating a goal, as well as some characteristic of the goal, by using multiple LED lights is applicable to other sports. For example in basketball, either 2 or 3 goal lights could be lit based upon the location the shot was taken from. Other examples will be obvious based upon those familiar with the various sports as all goals do have some differentiating qualities that can be represented either numerically (by the count of lights) or even by different colored lights.
  There are some manufacturers such as Daktronics that specifically produce goal lights for ice hockey. Note that these products use a red light to signify a goal and a green light to signify the end of a period. As will be understood by a careful reading of the present invention, turning on the different colors for goal (red) or period-end (green) are two separate commands to be issued to the Daktronics goal lamp based upon the content generation system's 201 determination of either goal (which is preferably a machine observation 200-4m coming from performance differentiator 200-4, but could be a human observation coming through scorekeeper's console 100-4a, 100-4b, 100-4c or 100-4d,) or of a period-end (which is preferably an automatic determination made through the scorekeeper's console 100-4a, 100-4b, 100-4c or 100-4d.)
Electro-mechanical Shutter 400-18a:
  The present inventor's prefer that the arena whose lighting is to be controlled uses some form of LED lights rather than the more traditional metal halide or fluorescent lighting. For the present purposes of dimming, the main advantage of LED lights is their ability to be cycled on and off at differing rates, thus producing different lighting levels, without damaging a ballast (i.e. the typical metal halide lamp should not be "flickered.") Hence, with LED lights the present system would send various commands that alter the rate of on verses off cycles in order to create the dimmed effect.
    A further advantage of using LED lights is that they often combine multiple individually colored LEDs (e.g. red, green and blue) that when powered in different combinations can create up to 16,000 or more distinct colors, including white which would be used during the game. In addition to changing the brightness (a function of luminosity) the present inventors further anticipate creating various color effects by automatically sending commands that change the mix of red, green or blue individual LEDs that are powered on at a given moment. One example uses would be to flash the lights in the color of the scoring team for each goal—and even to only have those lights flash on either the side of the performance area 100-1 where the goal was scored, or perhaps over the bench area of the scoring team. Various other ideas are possible as will be obvious to those skilled in the various sports as well as the types of characteristics that a given lighting system allows to be controlled. What is important to note is that any characteristic inherent to the lighting system that can be controlled, is useable by the present invention and triggerable by any machine 200-4*m* or human observation 100-4*m*, or combination thereof output as session content 200-5*c*.

However, especially in the amateur market the vast majority of sporting venues still use some form of lighting that cannot be easily dimmed by controlling it's on-off cycle; for example metal halide lamps. In this case, the present inventors prefer using electronically controllable mechanical shutters such as made by Wybron. The company offers several variations and even advertises the use of such dimmer/dousers in sporting arenas to create a dimming effect. What is new with the present invention is that these devices are automatically controlled, especially in combination with all other devices herein exemplified. As will be appreciated by those familiar with arena entertainment responsibilities, the ability to pre-establish rules for detecting any number of conditions instantly triggerable by human or machine observations has significant advantages, let alone the savings of labor expenses.

Laser Projector 400-J8*b*:

For this device the present inventors have identified at least one commercial product suitable for integration with the automatic entertainment system 400 herein described. Namely, the manufacturer ProlaserFX offers several products they term as "programmable laser graphics projection systems." These devices are capable of receiving real-time computer commands or executable scripts for controlling their various features, including the ability to control the laser image projected and to run various preprogrammed laser show sequences.

Dynamic Board Display 400-J9:

Layer 2: This is the active video display layer for which the present inventors prefer using such technologies as Amorphous silicon transistor (AST) panels which are now being manufactured by Hewlett Packard. This or similar technology is the preferred choice for use mounted along the inside (i.e. facing the action) of the ice hockey rink boards because of their: flexibility (to fit the curved board surfaces,) large sizes (e.g. a typical board ad is 92"×36",) ruggedness (to stand up to pucks and player contact,) and low costs (roughly $10 per square foot, which is significantly less than other technologies.)

Similar competitive displays (i.e. large area and flexible) using variations of OLED technology are being developed and several companies including Phillips, Sony, Universal Display Corporation, and several other manufacturers.

Layer 1 (optional): To support a brighter display, the present inventors also prefer backlighting the AST or OLED panel with a LCE panel provided by CeeLite (or similar) that operates on a variation of electroluminescence technology. Like the AST array, CeeLite's panels are flexible and can be made in custom sizes large enough to fit a 92"×36" area.

Similar competitive back-lighting panels are being manufactured with various OLED technologies including from manufacturers such as Phillips and Lumiotec.

Layer 3 (optional): To augment their ruggedness, the present inventors anticipate placing a thin polycarbonate (transparent) panel over the video display Layer 2, something that can then also be replaced over time as it becomes scuffed and scratched;

As an alternative, Zagg sells a nano-carbon based invisible thin film that can be adhered to the Layer 2 display screen for scratch proofing and protection, as opposed to the thicker polycarbonate solution.

Moisture proofing additive (optional): And finally, to avoid the negative effects of moisture on the electronic components, the present inventors prefer using a water resistant coating on all appropriate Layer 1 and 2 components, or at least those portions of the components that are susceptible to water damage. One such manufacturer of water resistant coatings is Golden Shellback Technology also marketed by ZAGG.

The aforementioned devices are exemplary for providing significant entertainment effects, especially for the example sport of ice hockey. Many or all of these devices can have the same, similar or different uses for either other sports or other types of events, such as but not limited to theatre, concerts, assemblies, conventions, corporate presentations, entertainment parks, etc. Conversely, other similar products could be used to obtain the same features or sufficient features.

Figure 7A:
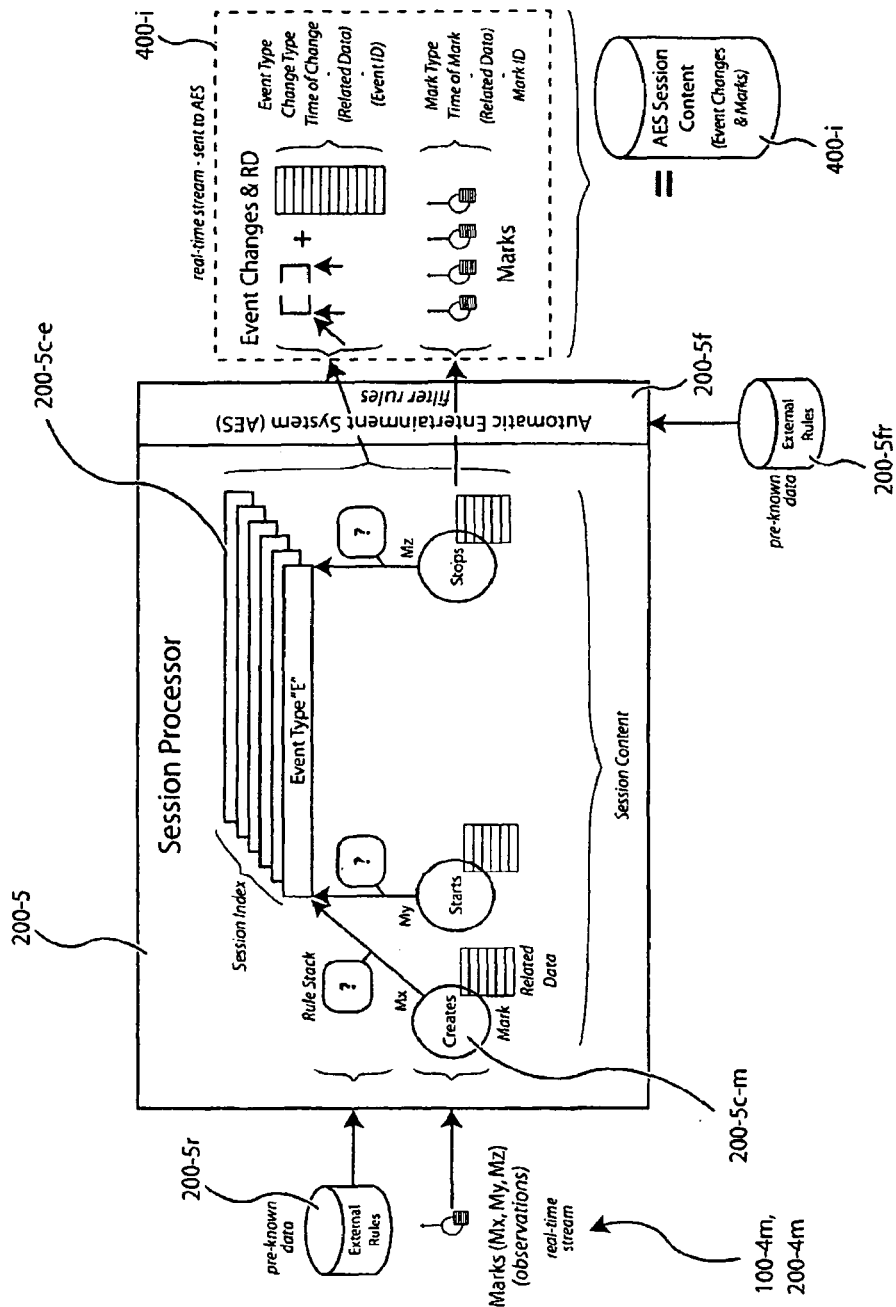
FIG. 7a is a block diagram depicting the translation, as directed by pre-known external rules, of the real-time stream of human and machine session observation (marks) into events (i.e. performance activities of limited duration) forming the session index—all of which was taught by the present inventors in a prior application. Further shown is how these observation same marks, resulting events and session index, collectively forming a portion of the session content, are then additionally filtered and processed into a real-time stream of event changes (i.e. on/off transitions) with related data. This translation of data then serves as the input to the automatic entertainment system, referred to as the AES Session Content.
Figure 7B:
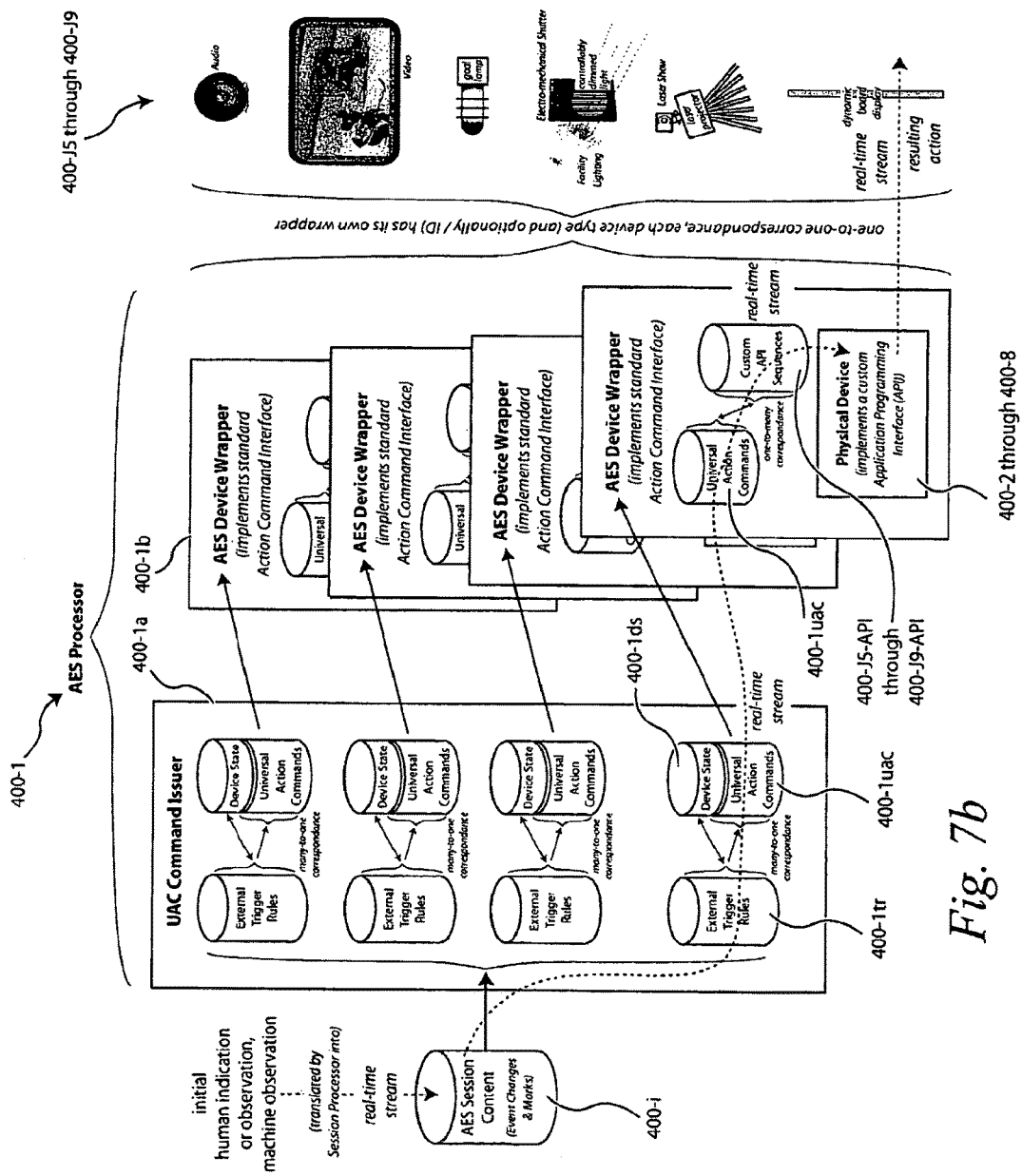
FIG. 7b is a block diagram depicting the translation, as directed by pre-known external trigger rules, of the real-time stream of AES Session Content into entertainment device state changes and universal action commands, where a device is for example some form of lighting control, laser projector, audio output, video output, goal lamp, dynamic board display, or similar entertainment or information output device. Further depicted is the translation of the universal action commands into a stream of custom application programming interface (API) sequences capable of altering a specific device's state.

What is most important is the teaching of a performance area 100-1 where participant 100-1*a*, 1*b* actions are monitored for either human and/or machine observations, the observations 100-4*m*, 2004*m* respectively of which are then combinable into content 200-5*c*. Where content 200-5*c* then serves as input to an automatic entertainment system 400 that operates in real-time to translate this input into distinct electronic commands for controlling the operation of one or more entertainment devices, such as but not limited to 400-J5, 400-J6, 400-J7, 400-J8*a*, 400-18*b* and 400-19. What is further preferred but not necessary is that the translation of human and machine observations 100-4*m*, 200-4*m* respectively are translated into content 200-5*c* via external rules by a therefore programmable session processor 200-5. What is also further preferred but not necessary and to be discussed in detail with respect to upcoming FIGS. 7*a* and 7*b*, is that the translation of the content 200-5*c* into distinct electronic commands for controlling the operations of an eternal device is also effected by the automatic entertainment system 400 under the control of external rules, therefore also making system 400 programmable, similar to session processor 200-5.

As will be appreciated by those skilled in the art of software systems and familiar with entertainment settings, many other devices may be desirable for use with automatic entertainment system 400. Therefore, while the use of the present exemplary devices 400-J5, 400-J6, 400-17, 400-18*a*, 400-J8*b* and 400-J9 are specifically claimed herein, they are not to be construed as limiting the present invention. For instance, other devices are conceivable such as using a fog machine that is used to create instant fog effects especially in the performance area 100-1. Again, what is most important is that any device capable of receiving real-time electronic commands for at least one of its actions can be used by the present invention's entertainment system 400 to execute those actions in response to the observed, detected, sensed and otherwise known activities of the participants 100-1a, 1b in a performance.

Figure 6A:
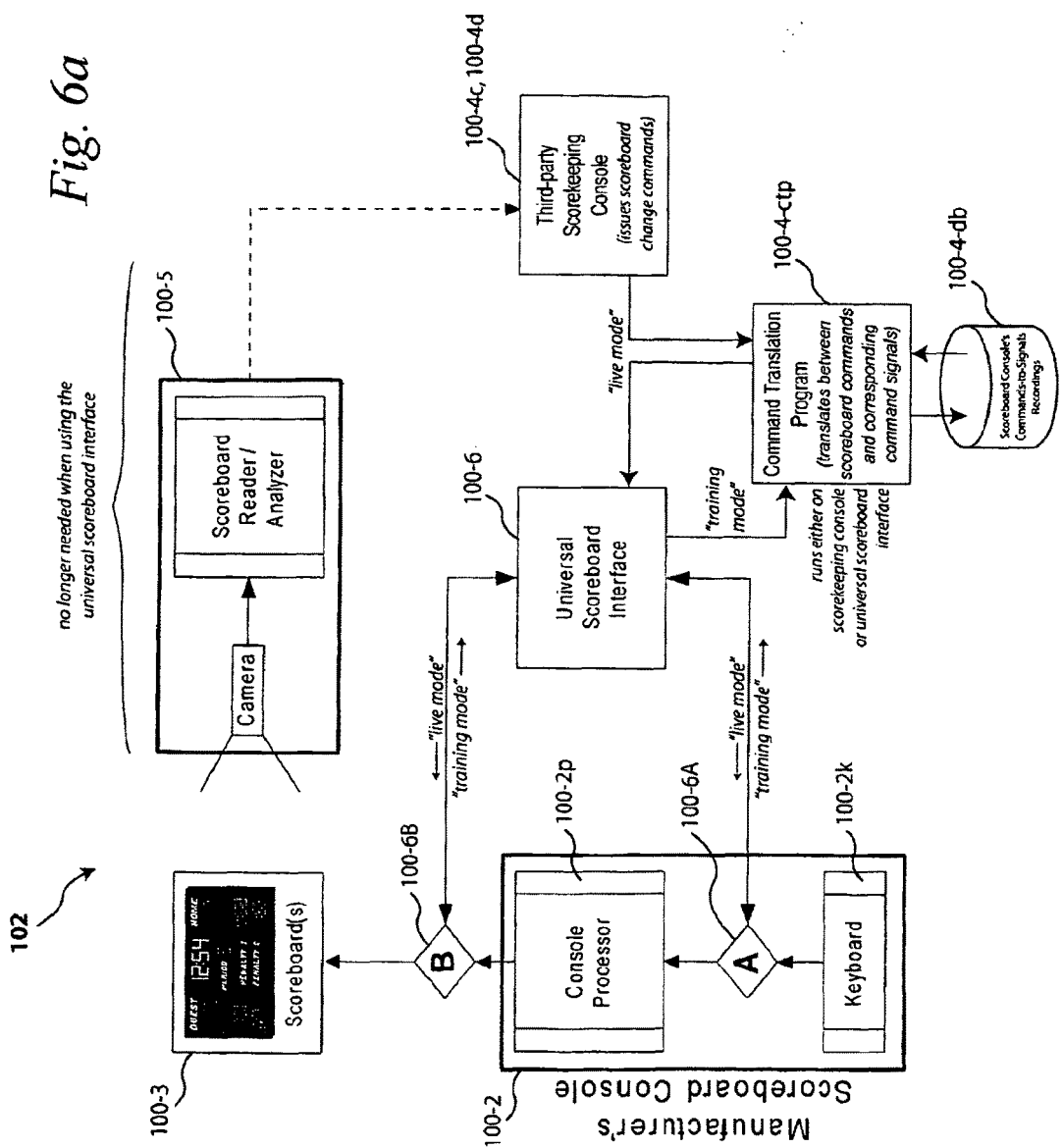
FIG. 6a is a mid-level block diagram specifically addressing the design of the universal scoreboard interface. In this first embodiment, the interface module has a first training mode and a second live mode. In the training mode, it records either keyboard or console processor output signals via either of two capture points in response to the controlled execution of an exemplary set of console commands entered through the keyboard by the scoreboard console operator. In live mode, these recorded signals (or variations thereof) are played back through the original capture point in response to scoreboard change commands issued through a third-party scorekeeper's console in response to its operator, thus making the signals appear as if they were originated within the scoreboard console without requiring a scoreboard console operator.

Referring next to FIG. 6a, there is shown a mid-level block diagram of the universal scoreboard interface 100-6 as it interconnects with the scoreboard console 100-2, the scoreboard 100-3 and the scorekeeper's console 100-4c (or 100-4d,) all of which was included in official scorekeeping system 102 as first taught in relation to FIG. 3a. Also shown in FIG. 6a is the prior art teaching of the present inventors regarding scoreboard differentiator 100-5 as it remotely detects face changes on scoreboard 100-3 for input into scorekeeper's console 100-4, all of which was first depicted in relation to FIG. 2. Briefly regarding scoreboard differentiator 100-5, its minimal purpose is to ascertain the official time of game and whether the game clock is running or stopped. As fully discussed in the prior SARTRIA application, this information is of significant value for forming the session index (Data I) related to all other session content 200-5c including the video and the box score. Furthermore, also as prior taught the current states of the game clock, i.e. running or stopped, are important for automatically alternating the input screens on scorekeeping console 100-4b (FIG. 2) to stay relevant to the game situation. However, there is no new teaching providing herein with respect to the differentiator 100-5 and its presence is not required by design if the universal scoreboard interface 100-6 is in use.

Still referring to FIG. 6a, manufacturer's scoreboard console 100-2 is shown to internally comprise two main parts, namely keyboard 100-2k whose output connects to console processor 100-2p input through juncture point A, 100-6A. Console 100-2 is also shown to have juncture point B, 100-6B where the output of processor 100-2p connects to the input of one or more scoreboard(s) 100-3. The present invention teaches that a first embodiment of the universal scoreboard interface 100-6 is connectable to either console juncture A or B, 100-6A or 100-6B respectively. In practice, it is anticipated that the interface 100-6 would be implemented as connectable to A or B, rather than A and B. Regardless of the connection point A or B, Interface 100-6 should have a training mode in which the scoreboard console 100-2 provides a series of outputs signals (i.e. from point A or B) in response to being operated over a series of fully-representative input commands. Hence, in "training mode" the console 100-2 is operated normally via its keyboard 100-2k through a set of game-representative scoreboard commands, such as:

Turn scoreboard on, off;
Set Game Period to value (9);
Set main clock to value (99:99:99:99);
Start/Stop clock;
Set Home, Away Goals to value (99);
Set Home, Away Shots to value (99), and
Set Home, Away Penalty 1 (or 2) to value—Player # (99) and Penalty Duration (99:99).

While the above commands are typically all that are necessary for operating the scoreboard at a youth ice hockey game, other sports will obviously have a different set of commands. What is important is that as the training operator presses various keys on console keypad 100-2k to indicate a command (where each command sequence typically ends in with the "enter" key,) the universal scoreboard interface 1006, either connected to juncture A or B, 100-6A or 100-6B respectively, intercepts either the keyboard's 100-2k or the console processor's 100-2p unique responses for transmittal to a Command Translation Program 100-4-ctp running either on the universal interface 100-6, the scorekeeper's console 100-4c, 100-4d, or even a separate PC. As will be understood by those skilled in software programming, the purpose of the Command Translation Program 100-4-ctp in training mode is to build a table associating a pre-known command (e.g. "start clock") with its equivalent A or B output signals. Preferably, the Command Translation Program 100-4-ctp stores this table of information in a database such as Scoreboard Console's Command-to-Signal Recordings database 100-4-db. Thus, after all representative commands have been entered, they are essentially repeatable by way of Recordings database 100-4-db.

For instance and still referring to FIG. 6a, if the scorekeeping console 100-4c, 100-4d is then connected in "live mode" to the universal scoreboard interface 100-6 which is further connected to the original training capture point A or B, 100-6A or 100-6B respectively, console 100-4c is then able to recreate valid "scoreboard change commands" which are oppositely translated by Command Translation Program 100-4-ctp back into equivalent A or B juncture signals, for direct input into console processor 100-2p (via juncture A) or directly to scoreboard 100-3 (via juncture B,) respectively.

In practice, the most difficult command to train and record is the resetting of the game clock to any and every possible time value. As will be understood by those familiar with ice hockey, a typical amateur game period may be anywhere from 12 to 20 minutes long and includes at least 4 consecutive numerals such as: tens-of-minutes (TT), minutes (MM), seconds (SS) and tenths of a second (tt). In this case, the Command Translation Program 100-4-ctp is preferably operated in training mode to capture a representative set of clock resets, covering the range of possible clock cell values. Since scoreboard console's 100-2 uses the same signals to represent a given number (i.e. "0" through "9") for any given cell (i.e. TT, MM, SS or tt,) it is only necessary to have the Command Translation Program 100-4-ctp record a single "T," "M," "S" or "t" cell cycling through each "0" to "9" value. As will be understood by those skilled in the art, the Command Translation Program 100-4-ctp can then automatically use the varying cell signals for each individual possible cell value to recreate the necessary signals for setting any cell and all cells to any combination of possible values.

As will be obvious to those skilled in the understanding of devices such as scoreboard console 100-2, having to physically connect to a juncture point A, 100-6a, requires that console 100-2 be physically modified in some way, or at the very least its exterior casing be opened to expose this connection point. However, as will also be understood, making this connection is possible and does have value as previously described herein. While a given manufacturer (e.g. Daktronics) typically has more than one physical console design 100-2, even if each design implements a different external keyboard 100-2k layout and/or a different internal connector pin-count for attaching to processor 100-2p, the basic electronic functionality is the same. Hence, most keyboards work to short a pair of row/column wires overlaying each other underneath a given external key and then most keyboards will connect to their console's processor 100-2p using a ribbon cable. Thus providing the opportunity to create a juncture A connector that may support a variable number of wires depending upon the possible outputs for a given console's 100-2 keyboard 100-2k.

Figure 6B:
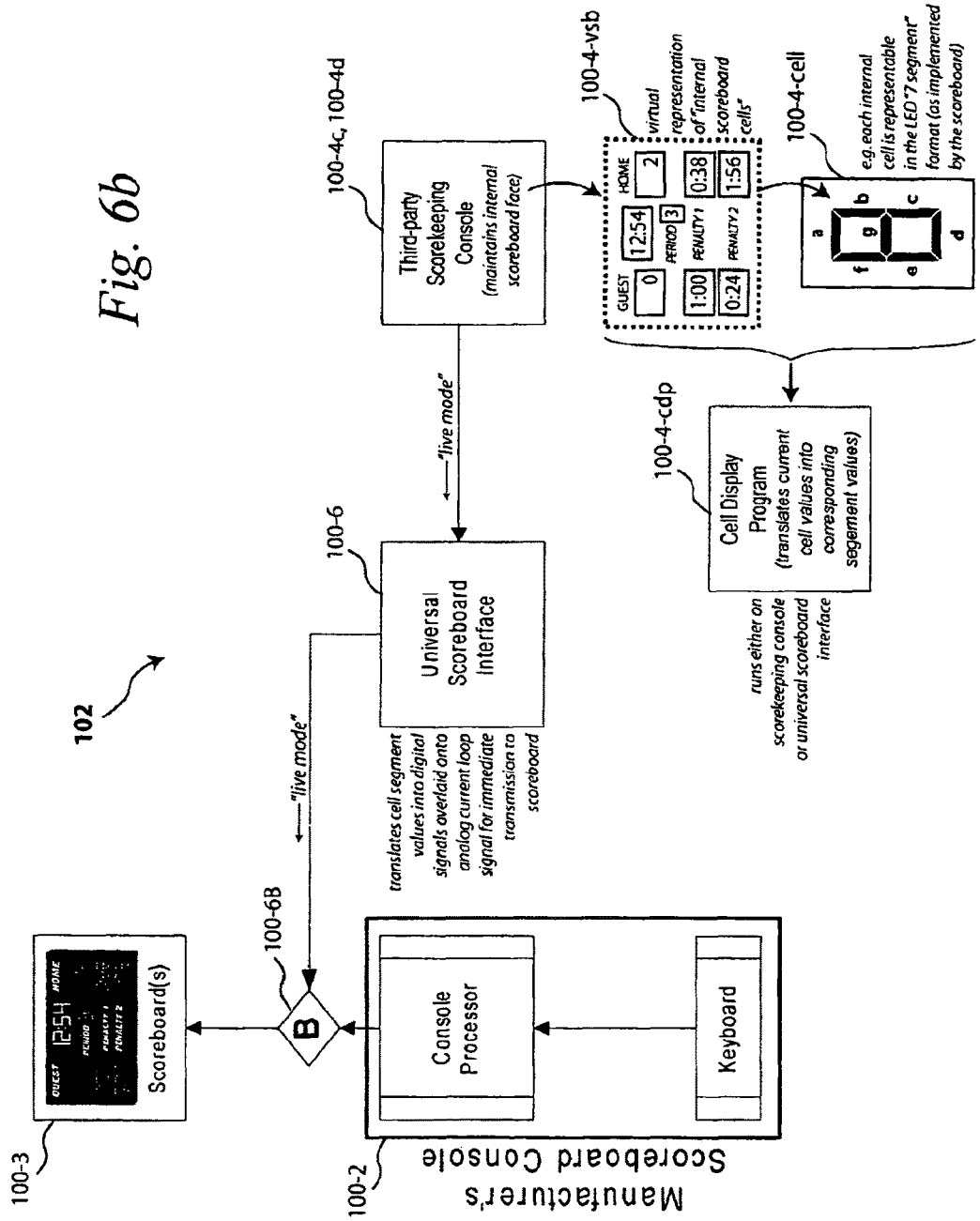
FIG. 6b is a mid-level block diagram showing a second alternate embodiment of the universal scoreboard interface. As opposed to FIG. 6a, the preferred interface module only has a live mode and therefore only needs to interface to the scoreboard and never to the scoreboard console (i.e. for "recording signals.") In this embodiment, the scorekeeper's console is enhanced to maintain an internal virtual scoreboard which is periodically monitored by a cell display program that converts each character on the virtual scoreboard into the appropriate cell segments for driving the corresponding scoreboard characters.
Figure 6C:
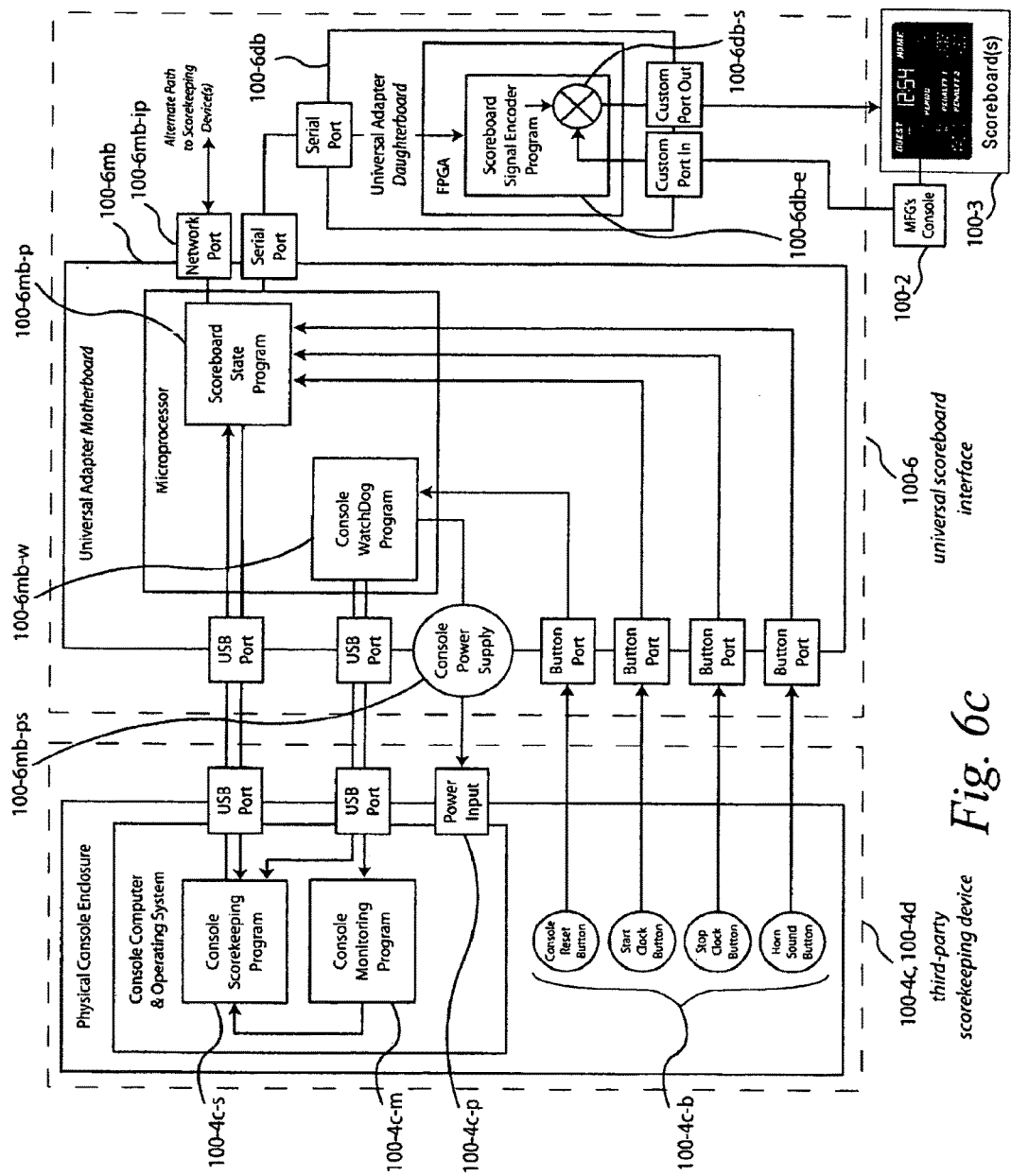
FIG. 6c is a circuit diagram of one possible implementation of the second embodiment of the universal scoreboard interface as taught in relation to FIG. 6b.

Now referring to FIG. 6a and FIG. 6b, while juncture A, 100-6A will provide the herein taught benefits, the present inventors prefer to work with juncture B, 100-6B. Using juncture B provides the immediate advantage of a simple to access external connection point that typically employs a universal connector such as ¼" "tip and ring" (also called "phono-plug") connector. This tip and ring connector is common to the telephone industry and supports the current-loop signal format used by the typical manufacturer's console 100-2 to drive the associated scoreboard 100-3. Thus, it is relatively simple to interface with console processor 100-2p juncture B for the purposes of recording the output signals in training mode as well as scoreboard 100-3 juncture B for the purposes of outputting recorded signals in live mode.

Referring now specifically to FIG. 6b, rather than simply recording output signals from juncture B, it is possible to by-pass the training/recording phase all together based upon a deeper understanding of the digital data embedded in the analog current-loop signal output by the console processor 100-2p to the scoreboard 100-3. As will be known by those familiar with scoreboard technology in general, console 100-2 embeds an additional digital signal that represents the various scoreboard cell segment values onto the "carrier" analog current loop signal. Hence, the scoreboard 100-3 itself is simply made up of various display cells, where each display cell can form at least the numeral characters of "0" through "9". By aligning several of these cells sequentially, the scoreboard face represents different game information. For instance, the game clock requires 8 sequential cells: "T,T,M,M,S,S,t,t." Each individual cell in turn is typically represented as a set of segment values, where the combination of segment values creates the various characters—all of which is well known in the art of electronic displays and depicted in the lower right hand corner of FIG. 6a as 100-4-cell (with individually addressable cell segments a, b, c, d, e, f & g.)

Hence, the signals transmitted from console processor 100-2p via juncture B, 100-6B, to scoreboard 100-3 are actually digital commands to turn on an off individual 100-4-cell segments (a, b, c, d, e, f & g) on the scoreboard face. The transmitted signals are not game commands (such as "start clock".) Thus, as will be understood by a careful reading of the present teachings, using juncture B, 100-6B, as opposed to A, 100-6A, provides an additional opportunity to eliminate the necessity of a training mode. In the preferred implementation, the scorekeeper's console 100-4c and 100-4d simply maintains an internal virtual scoreboard 100-4-vsb of all of the current individual 100-4-cell values to be displayed on the scoreboard 100-3. On a periodic cycle, a Cell Display Program 100-r-cdp reads all the cell values on the virtual scoreboard 100-4-vsb and translates their current values into corresponding digital signals representing the various segments (a, b, c, d, e, f & g) necessary to create their current character (e.g. "0" through "9".) These cell segment digital values are then overlaid by the universal scoreboard interface 100-6 onto the carrier analog current loop signal for output to the scoreboard 100-3.

Note that if the Cell Display Program 100-4-cdp is running on the scorekeeper's console 100-4c or 1004d (which is preferred,) then the universal scoreboard interface 100-6 is simply acting to embed the digital signals representing the current set of cell segments into the analog current loop signal being output to scoreboard 100-3. As will be understood, it is also possible that the Cell Display Program 100-4-cdp is also run directly on universal interface 100-6, in which case scorekeeper's console 100-4c or 100-4d must continually provide to interface 100-6 data representing all current cell values on virtual scoreboard 100-4-vsb to be displayed on the real scoreboard 100-3.

Referring next to FIG. 6c, there is shown a working digital circuit for implementing the universal scoreboard interface 100-6 as described in relation to FIG. 6b that was created by the present inventors for interfacing to a Daktronics Scoreboard normally controlled by a 4000 series console 100-2; hence the preferred version that interfaces to juncture B, 100-6B and transmits digital representations of each scoreboard 100-3 cell's segment values (a, b, c, d, e, f & g) as carried by the analog current loop signal.

The list of parts and connections associated with FIG. 6c are as follows:

(to be provided)

Referring next to FIG. 7a, there is shown session processor 200-5 that was first taught by the present inventors in the prior SARTRIA application. The purpose of session processor 200-5 is to accept and translate into a session index one or more human or machine observations 100-4m, 100-5m respectively, being made about a performance concurrent with the recording of that performance (e.g. video and/or audio.) As prior taught, the session processor 200-5 performs its translation functions under the direction of external rules 200-5r, thus making it externally programmable and therefore also more universally adaptable to various types of performances ("sessions",) such as but not limited to sporting, theatre and music Events. Furthermore, all human and machine observations 100-4m, 100-5m respectively are packaged into a common "mark" 200-Sc-m dataset that minimally defines the type of mark (e.g. "goal mark,") the session time of mark and any related data (e.g. "player, assist 1, assist 2, etc.") As the marks 200-5c-rn are received by the session processor 200-5 and processed according to the external rules 200-5r, they may serve to create, start or stop one or more associated types of events 200-5c-e (where lower case "e" vent refers to a limited duration activity detected within the performance, e.g. "scoring a goal," vs. the entire performance itself, which is commonly referred to uppercase "E" vent.) It is the combination of these limited duration activities, or events 200-5c-e, that together form a session index into the recording(s) of the performance—all as previously taught.

Still referring to FIG. 7a, what is new is that the session processor 200-5 now includes an additional AES output filter 200-5f for controllably selecting and packaging a real-time stream of event 200-5c-e changes with related data and observation marks 200-5c-m with related data to automatic entertainment system (AES) session content data based 400-i. As will be understood by a careful reading of the present inventor's prior SARTRIA application, session processor 200-5 may potentially receive a significant number and range of observation marks 100-4m and 200-4m. For instance, for sporting Events the human observations 100-4m may come from the game officials 100-1a, the scorekeeper through console 100-4a, 100-4b, 100-4c or 100-4d, or a remote observer through observation entry device 100-2a. Also at a sporting Event, while the present inventors have taught and prefer the use of machine vision object tracking systems such as 200-3, other tracking systems based upon RF, IR, UWB, GPS, etc. already exist in the prior art and are anticipated within the present and prior teachings.

As will be clear to those familiar with the preferred and anticipated entertainment devices 400-J5, 400J6, 400-J7, 400-18a, 400-J8b and 400-J9 first listed with respect to FIG. 5, not all of the session content 200-5c (including marks 200-5c-m and events 200-5c-e) is important for controlling their functions. Thus, while not necessary, the present inventors prefer adding AES output filter 200-5f to session processor 200-5 for the purposes of creating limited AES session content 400-i under the control of external rules 200-5fr. As will be understood by those skilled in the art of software systems, many variations are possible for providing filter 200-5f, with or without the preferred external rules 200-5fr, outputting AES session content 400-i in various possible formats. What is most important is the data collected in real-time about the current performance is provided to one or more entertainment devices such as but not limited to 400-J5, 400-J6, 400-J7, 400-18a, 400-J8b and 400-J9. While it is preferred, this data collected does not need to be represented as observations marks 200-5c-m or event 200-5c-e changes, nor does it need to come through a session processor 200-5, but rather the data collected could come directly from the observing devices, e.g. the scorekeeper's console 100-4a, 100-4b, 100-4c, 100-4d or the object tracking system 200-3; many variations are possible and anticipated without departing from the scope of the teachings herein provided.

Referring next to FIG. 7b, there is shown the preferred automatic entertainment processor 400-1 comprising first a UAC issuer 400-1a and second one or more device wrappers 400-1b. Command issuer 400-1a preferably receives a filtered real-time stream of AES session content 400-i for triggering the issuance of one or more universal commands 400-1uac to be sent to one or more entertainment device 400-15, 400-J6, 400-J7, 400-J8a, 400-J8b and 400-J9, thus effecting their actions (i.e. state changes 400-1ds.) As prior discussed in relation to FIG. 7a, AES session content 400-i preferably includes real-time observations being made about the ongoing performance by either operators using input devices referred to as human observations 100-4m or automatic machines making machine observations 2004m. Regardless of how the observations are made, regardless of how they are provided (e.g. via a session processor 200-5,) and whatever their associated data formats (e.g. marks 200-5c-m and events 200-5c-e,) this AES session content 400-i serves as triggers for turning on and off various features (actions) of any one or more entertainment devices 400-J5, 400-J6, 400-17, 400-J8a, 400-J8b and 400-J9.

While not necessary, the preferred automatic entertainment processor 400-1 operates under the direction of a distinct set of external trigger rules 400-1tr for each distinct type of entertainment device 400-J5, 400-J6, 400-J7, 400-18a, 400-J8b and 400-J9 to be controlled. As will be understood by those skilled in the art of software systems, rather than using generalized external rules so that the entertainment processor 400-1 becomes externally programmable, it is feasible to hard-code the decision logic herein described directly in processor 400-1. Thus, while hard-coded software is not preferred, it will still perform the primary novel function taught herein of affecting the real-time, automatic control of one or more entertainment devices such as 400-J5, 400-J6, 400-17, 400-18a, 400-J8b and 400-J9, based upon information originated by either humans and/or machines regarding the ongoing performance. As will also be understood by those skilled in the art of software systems, there are many ways of creating external rule sets 400-1tr that can be processed in combination with the AES session content 400-i in order to automatically select (or not) from one or more potential universal commands 400-1uac. The present inventors will define their preferred implementation of UAC command issuer 400-1a with respect to upcoming FIGS. 8a through 8d; suffice it to say that the pattern of implementation is similar to that adopted within the prior application disclosing the session processor's 200-5 functions.

Referring still to FIG. 7b, for each unique device type such as 400-J5, 400-16, 400-J7, 400-J8a, 400-18b and 400-J9, UAC command issuer 400-1a ideally maintains a device state 400-Ids table that itself is used as additional input along with external trigger rules 400-1tr and AES session content 400-i for determining subsequent issuance of specific universal action commands 400-1uac. For example, in the case where the device type is an audio system 400-J5, the relevant AES session content 400-i would at least include the observations marks 200-5c-m of: "clocked stopped" and "clock started." Realistically, they should also include the "game started," "period started," "period stopped" and "game stopped" marks. Assuming that the startup device state 400-Ids of the music system 400-15 is "off," then external rules 400-1tr will indicate to the UAC command issuer 400-1a that: "IF game started AND period started AND clock stopped" THEN issue universal action command 400-1uac "Start Music." Conversely, "IF device state=on AND (clock started OR period stopped OR game stopped)" THEN issue universal action command 400-1uac "Stop Music." While this present example is representative in that it includes the three preferred types of control information input to AES processor 400-1a as well as the two types of action information output by UAC command issuer 400-1a, it should not be in any way construed as limiting. Hence, there are many well-known higher-level language constructs that are equally capable of expressing the necessary logic.

What is most important to the preferred teachings is the three input data sets including AES session content 400-i, external trigger rules 400-1tr and device state 400-Ids along with two output data sets including device state 400-Ids and universal action commands 400-1uac. As prior stated, while the AES processor 400-1a could be hard-coded and thus not require external trigger rules 400-1tr, to accomplish the herein taught minimal functionality, it must receive/know session content 400-i in some format indicative of the current state of the performance as well as the current device state 400-Ids of the entertainment device (e.g. 400-J5) being controlled. As will be well understood by those familiar with software systems, it is not necessary that UAC command issuer 400-1a issue a universal action command 400-1ds that itself must then be "locally interpreted" by each unique device (e.g. a Kintronics Information Technology's "PA over IP" system) of a given device type (e.g. 400-.15 PA and Music System,) since command issuer 400-1a could just as well have issued the exact device specific commands directly interpretable by the given unique device. (As is well known in the art, these "device specific commands" are typically pre-established in a software application interface (API) or equivalent that is usable for electronically and programmatically controlling the given device.)

Thus, still referring to FIG. 7b, while not necessary UAC command issuer 400-1a ultimately and preferably outputs one or more universal action commands 400-1uac in real-time across any necessary communication path usable for electronically controlling a given unique device (e.g. a Kintronics Information Technology's "PA over IP" system.) As will be well understood by those familiar with software systems, using the preferred approach of issuing universal commands 400-1uac (e.g. "start music" or "stop music") has many advantages. First, this approach supports the best practice of loose coupling between the UAC command issuer 400-1a and the specific device wrapper 400-1b (e.g. a Kintronics Information Technology's "PA over IP" system,) which in turn means that the external rules 400-1tr may be pre-established for the given device type (e.g. 400-J5 PA and Music System) in general, prior to actually selecting the exact device (and therefore wrapper 400-1b) to be implemented (again for example a Kintronics Information Technology's "PA over IP" system.) Another obvious benefit is the reduction in hard-coded logic within UAC command issuer 400-1a that tends over time to become outdated and difficult to maintain, all of which is familiar to those skilled in the art of software systems.

As will also be well understood by those familiar with software systems in general and the programming of devices with software API's in particular, each universal command 400-1uac that is intended to effect the actions of a given device type (e.g. 400-15 PA and Music System) must then be translated into one or more actual API commands recognized by the specific device (e.g. a Kintronics Information Technology's "PA over IP" system.) As shown in FIG. 7b, the present inventors prefer the use of an AES device wrapper 400-1b software construct that includes embedded methods already capable of receiving any universal command and then invoking an associated method for translating that command into the custom API sequence(s) (e.g. 400-15-API) necessary to accomplish the desired resulting device action. While various software implementations of the AES device wrapper 400-1b are possible, the present inventors prefer that the specific custom API sequences (e.g. a sub-set of 400-15-API,) to affect the behavior of a specific device (e.g. a Kintronics Information Technology's "PA over IP" system,) for a specific universal action command (e.g. "start music,") be stored as data external to the device wrapper 400-1b itself. While this is preferred it is not necessary for the present invention and should not be construed as a limitation. The present invention would still perform its basic intended function if the translations of universal commands into custom API sequences was hard-coded within wrapper 400-1b. As prior mentioned and as will be well understood by those familiar with software systems, this technique for externalizing such data tends to support more robust and maintainable software.

Still referring to FIG. 7b, after human and/or machine observations 100-4m, 200-4m (as contained in real-time stream of AES session content 400i,) are converted into a real-time stream of universal action commands 400-1uac by UAC command issuer 400-1a using external trigger rules 400-1tr and knowledge of each entertainment device's state 400-1ds, the commands 400-1uac are then converted into a real-time stream of custom API sequences (such as 400-J5-API through 400-J9-API) by AES device wrappers 400-1b, such that a corresponding real-time stream of custom action commands are provided to one or more specific entertainment devices (of types such as 400-J5, 400-J6, 400-17, 400-18a, 400-J8b and 400J9) for creating various entertainment, information or otherwise performance effects.

Referring next to FIG. 7c, there is shown a table of the preferred data fields comprising a universal action command 400-1uac. Those skilled in the art of software systems and in particular databases will be familiar with the UAC Data Fields as described in the table and without further explanation needed (where the initials "Opt" to the left of the Data Fields column means "optional.") As will also be understood, while the portrayed UAC Data Fields are preferred, they are not necessary as other variations are possible without departing from the scope and teachings of the present invention. What is important with respect to the preferred universal action command 400-1uac is that it holds sufficient information to be processed by multiple unique entertainment devices (e.g. as sold by different manufactures such as Kintronics, Barix or Stentofon) that each represent the same single type (e.g. 400J5 PA and Music System.) The present inventors further prefer that the universal action command format be sufficient for processing by all unique entertainment devices of all types (such as 400-J5, 400J6, 400-J7, 400-J8a, 400-J8b and 400-J9.) As will be understood by those familiar with software systems and databases, beyond the specified UAC Fields and their purposes as depicted, the exact formats and representation of the proposed fields are also immaterial to the present invention.

Referring next to FIG. 7d, there is shown a table of exemplary entertainment devices including 400-J5, 400-J6, 400-J7, 400-J8a, 400-J8b and 400-J9 and others. Along with each example of the device type, there is also listed its general purpose, data source type and use as well as example data outputs. Those familiar with the devices types herein discussed and reviewed in present figure will understand the entertainment value provide by the listed example data outputs. Those skilled in the art of software control systems will understand that the present invention sufficiently teaches apparatus and methods for automatically controlling the listed devices types to accomplish their example data outputs, all in coordination with the on-going progress of a performance. Hence, the reader will understand that present invention provides significant value by at least allowing a performance to be enhanced without additional labor costs for the operation of the listed entertainment devices, or any similar devices, such as listed in FIG. 7d as of "other" "Part"s.

Still referring to FIG. 7d and also to FIG. 7c, special attention is drawn to the following teachings. First it is noted that the Data File to be output (or transmitted) to a given entertainment device may be intended for either for direct expression through the device (e.g. text to be converted to speech or shown on a display, or a video to be shown on a display,) or it may be a script file specifying control attributes to be varied on the entertainment device (e.g. brightness, color, fog level, volume.) Second, the Source of the Data may either be attached to the UAC 400-1uac itself, it may be fetched from a database, or it may be from an ongoing data stream. The database or stream could be either local or remote to the automatic entertainment system 400. One anticipated use of an external database is to hold a list of music for immediate and automatic purchase and download by system 400. This database might be maintained by some third party and made generally available via the internet. It is further anticipated that the database would include songs that have been tagged with several key fields, or at least semantic tokens for their variable selection. One ideal and well understood storage methodology for accomplishing this type of functionality would be to use a SQL server database with multiple search fields for each song therein contained, such as but not limited to and for example with respect to the sport of ice hockey:

Session Type, e.g. "Sport, Ice Hockey, Game";
Competition Level, e.g. "High School";
Performance event, e.g. "Play Stopped, Home Goal, Away Goal, Home Penalty, Away Penalty";
Score Differential, e.g. "H0, H1, H2, H3, H4, etc." meaning that the Home Team is ahead by 0, 1, 2, 3, 4, etc. goals, with similar values for the Away Team;
Time of Game, e.g. "P1:00, P1:05, P1:10, P1:15, P1:99, P2:00, etc." meaning the period in five minute increments where "99" means the last minute in the period, and/or Theme, e.g. "Sporty, Hard Rock, Popular, Science Fiction, etc."

As will be understood by those familiar with sports in general, these types of information are either readily available from the official scorekeeping system 100, 101, 102 or 103, or are preferences (e.g. "Theme") that can be easily pre-set prior to the performance. Hence, when each UAC command 400-1*uac* is generated for retrieving a data file from a database (such as a song from a remote third-party database,) the UAC 400-1*uac* preferably includes an search string (such as an SQL select statement) for determining which data files stored in the database should be included in the possible list of choices for output (where the SQL select statement is referred to in FIG. 7c as the Data Source Inclusion Filter.) Using this teaching, the third-part music supplier could maintain a list of songs being updated over time that are tagged for appropriateness to a given sport, age level, situation and preference, etc. The automatic entertainment processor 400-1 is then responsible for selecting one or more potential songs, after which it may then randomly select one song, or simply take the next song on the list with the possible exclusion of any songs already taken for the same set of inclusion filter parameters, if two or more potential songs is returned from the queried database—all as will be understood by those familiar with controlling the play of music at a sporting event. The present inventors also anticipate that the "included" list of potential songs retrieved by the SQL select statement (or similar database search technique,) could have a second or multiple exclusion filters applied prior to the final selection. An example exclusion filter for songs would be a specific list of individual songs that those responsible for the performance do not want output, even though the songs (data files) otherwise match the normal search criteria—thus providing the local entertainment system 400 user with a way of overriding the choices made possible by the third-party database provider.

While not depicted in the figure herein, it will be obvious to those skilled in software systems in general and internet ordering systems in particular, that the third-party database supplier could track the usage of their data and conduct appropriate automatic billing. The present inventors specifically include this type of automatically searchable database of output data files, especially including songs and video clips, as a novel teaching of the present invention. It is further anticipated that the database is ideally stored remotely with internet access available, and that the database is connected to an automatic billing system for accounting for the transaction.

The following FIGS. 8a through 8d are all taken directly from the present inventor's prior related application entitled SESSION AUTOMATED RECORDING TOGETHER WITH RULES BASED INDEXING, ANALYSIS AND EXPRESSION OF CONTENT, also herein referred to as SARTRIA.

Figure 8A:
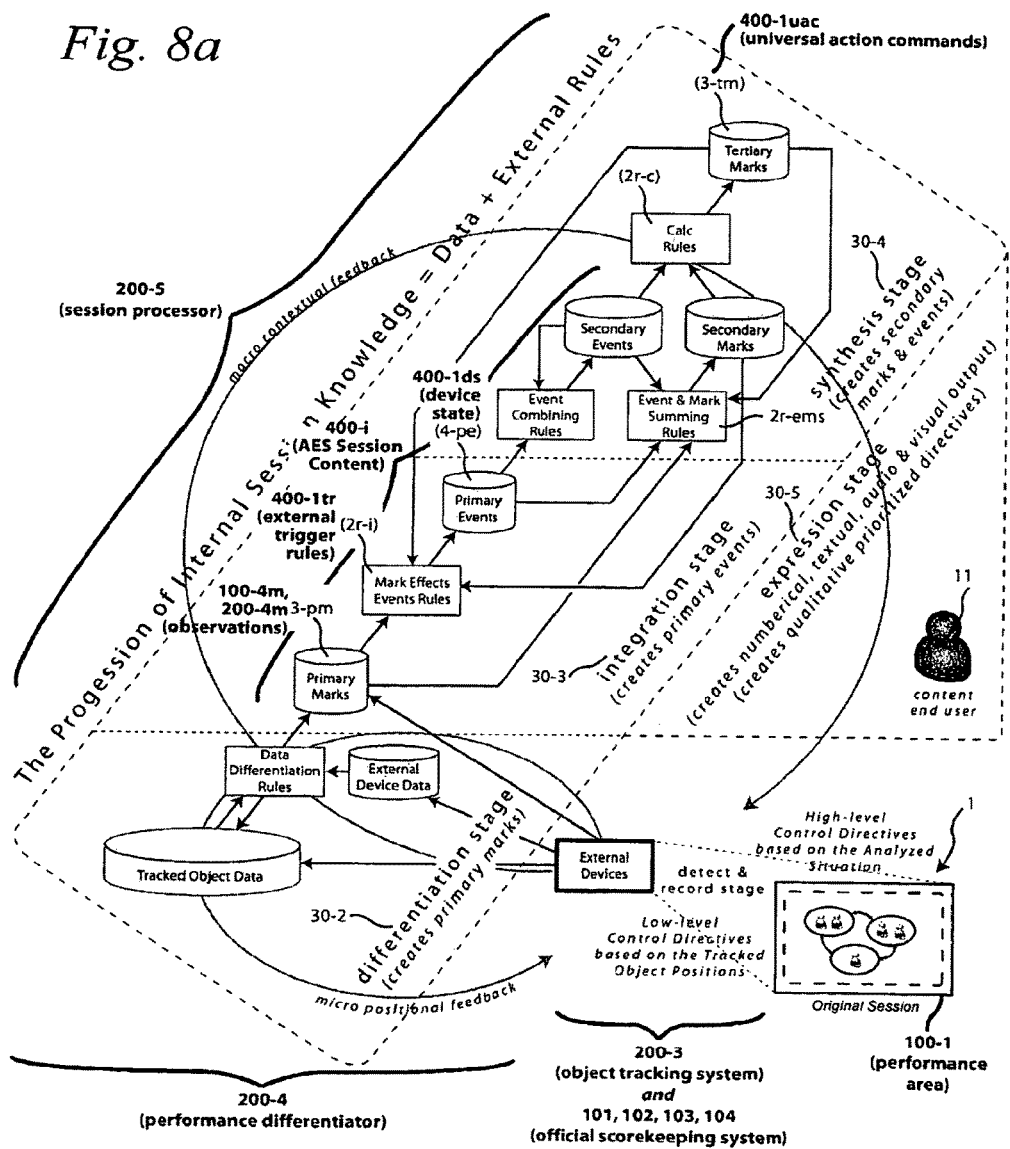
Figure 8C:
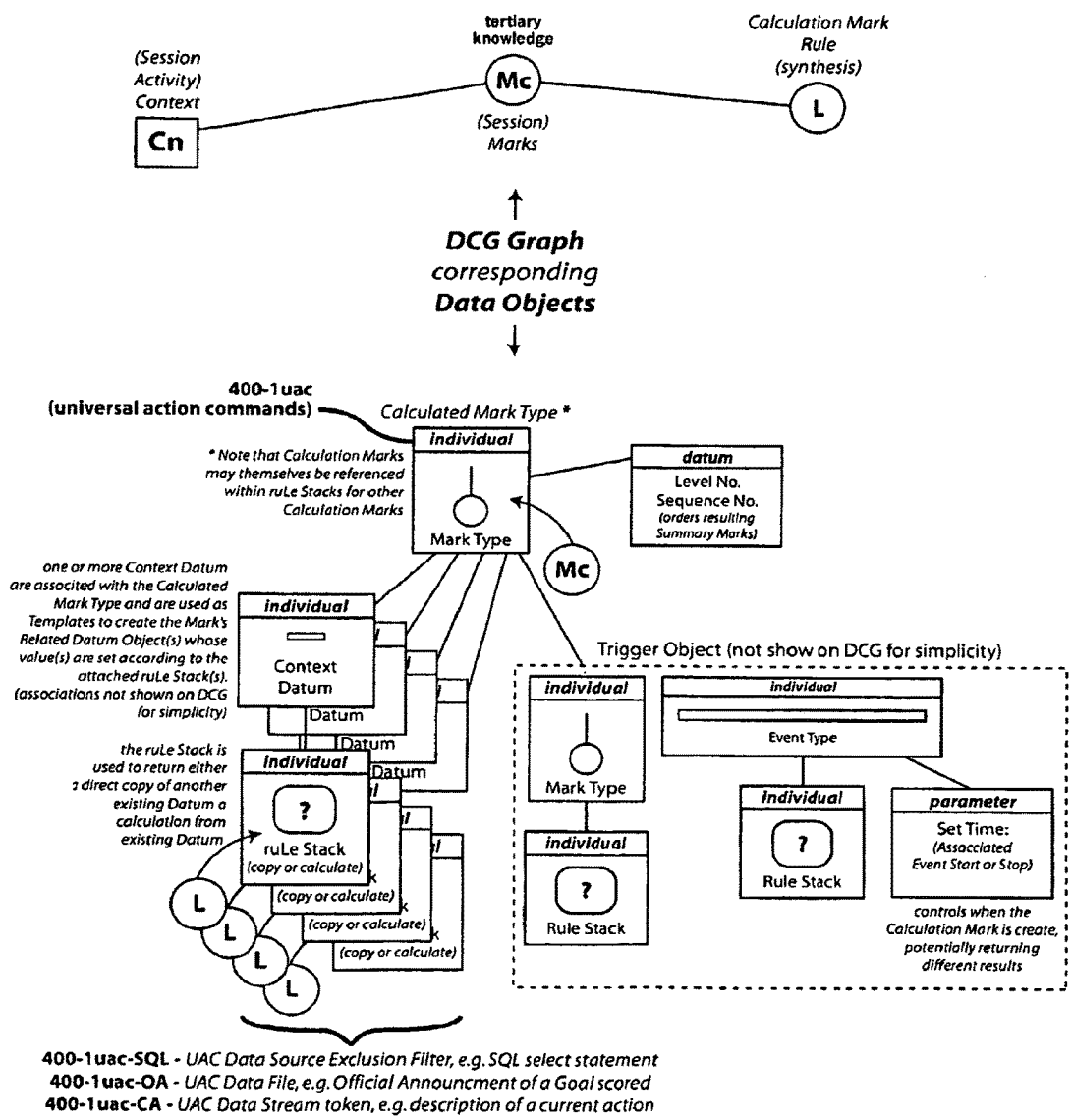

Referring next to FIG. 8a, amongst other important new teachings, this prior SARTRIA application defined a universal protocol for normalizing human and machine "external observations" into "marks" (a step called "differentiation,") as well as a "session processor" for both "integrating" these "marks" into "events" and then "synthesizing" the combined mark and event "session knowledge" into "summary and tertiary marks" (or "internal observations.") The session processor also included a final stage referred to as "expression" where for instance, the events could be associated into custom "foldering trees" for later organized retrieval—thus serving as a "session index" into all recorded "session content" such as video and audio.

Still referring to FIG. 8a (and to FIG. 5,) while the present system taught herein prefers the use of a content generation system 201, and even more specifically the object tracking, performance differentiator, session processor solution prior taught, it will be obvious to those skilled in the art that other software implementations are possible without departing from present novel teachings for interfacing with and controlling an automatic entertainment system 400. Furthermore, the present inventor has depicted the automatic entertainment processor 400-1 as a subsequent service to be performed after the initial work of the content generation system 201 in general, and the session processor 200-5 in particular, has created session content 200-5c; where the communication between the two is primarily through AES session content 400-i (a derivative of session content 200-5c implemented as a real-time data stream.) Those skilled in the art of software systems will understand that sufficient uses and specification for a separate preferred automatic entertainment processor 400-1 have been herein taught; where these teaching's in summary include programmable control via external trigger rules 400-1*tr*, the monitoring of entertainment device states 400-1*ds*, the issuance of universal action command 400-1*uac* and then finally the translation of the universal command 400-1*uac* into specific API sequences (such as 400-J5-API) for controlling a specific entertainment device (see especially FIG. 7c.)

Figure 8D:
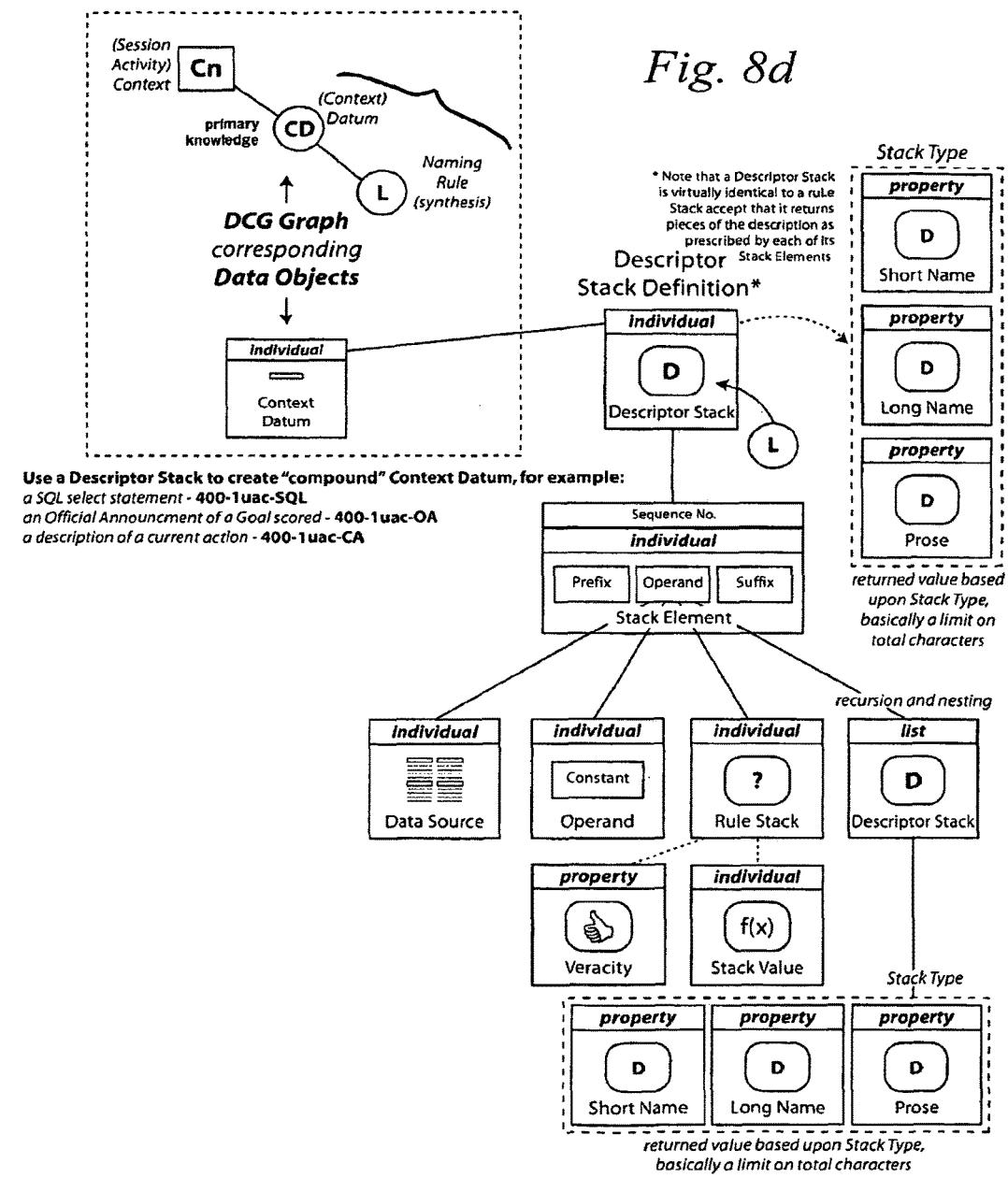

Now exclusively referring to FIG. 8a, the present inventors show that the prior taught session processor (also herein preferred for use in content generation system 201), with one variation to be discussed in relation to FIG. 8d, is further usable and preferred for implementing at least the UAC command issuer 400-1a portion of the automatic entertainment system processor 400-1, including all of issuer 400-1a's preferred features of programmable control via external trigger rules 400-1*tr*, the monitoring of entertainment device states 400-1*ds* and the issuance of universal action commands 400-1*uac*. Furthermore, based upon the teachings of the prior SARTRIA application, two distinct configurations are possible. In the first case, as depicted in FIG. 5, the UAC command issuer 400-1a (as implemented using a session processor similar to 200-5,) can remain connected to the output of the "session indexing" session processor 200-5. Hence, in this first case there would be two separate session processors connected in series. In the second case, the two session processors can be connected in parallel. As will be understood by a careful reading of the prior taught SARTRIA patent, the teaching anticipated these various serial or parallel configurations and specifically included a "mark messaging pipe" (e.g. see SARTRIA FIGS. 32a, 32b,) for the purposes of carrying any and all human or machine observations (such as made through or by "external devices" for example scorekeeping system 101, 102, 103 or performance differentiator 200-4) to the input port of one or more session processors working in parallel. As further teaching, it was shown that every session processor is able to connect its output port to the same mark message pipe (e.g. see SARTRIA FIG. 38b,) thus supporting an infinite ability to nest session processors as needed for the desired session content transformations—all as will be well understood by those familiar with software systems in general, and object oriented programming in particular. And finally, as will also be understood, a single session processor such as herein depicted 200S, could perform both the processing of session content 200-5c simultaneously with the UAC command issuance 400-1a, thus incorporating the first portion of the automatic entertainment processor 400-1 into the content generation system 201.

Still referring to FIG. 8a, the reader is directed to the bolded bracketing, numbering and accompanying descriptions that are shown in an effort to relate the original teaching to that herein specified. Specifically, in the lower right of FIG. 8a, the original SARTRIA performance area 1 is herein referred to as 100-1. Just to the left of performance area 1, there is show the original external devices (e.g. in the present application including but not limited to scorekeeping system 101, 102, 103 or object tracking system 200-3.) These external devices then generate external device data and primary marks (originally 3-$pm$) now 100-4$m$, 200-5$m$ in a stage referred to as differentiation 30-2 (herein including performance differentiator 200-4.) The present inventors herein teach that in the prior taught second stage of integration 30-3, primary events (originally 4-$pe$) may now be used to represent a single entertainment device type, e.g. 400-J5, 400-J6, 400-J7, 400-J8a, 400-18b and 400-19. As will be understood from a careful reading of the prior SARTRIA application, an event type is a template object meaning that it serves as pre-knowledge used to create one or more actual instances of the type during a session. In this way, if an event type is used to represent an entertainment device type (e.g. 400-J5 PA and Music System,) then during the processing of an ongoing session, an actual instance of the event type can be used to represent the current "on/off" state of an individual device (e.g. a distinct Kintronics Information Technology's "PA over IP" system.)

Hence, when it is understood that the (actual) event instances of a given (template) event type form a digital waveform over session time, then it will also be understood that this waveform can be used to represent the transition points (i.e. changing device states 400-1$ds$) of a specific (i.e. actual) entertainment device. (For examples of this waveform teaching in the SARTRIA application, see FIGS. 26a, 26b, 26c, 28a, 28b and 28c.) Thus, when a specific device (such as Kintronics System 400-J5) is sent a universal action command 400-1$uac$ to start outputting a data file, i.e. it is "turned on," then an actual event instance can be created and started (thus going "high" in electronics terminology.) Likewise, when the device is sent a command 400-1$uac$ to stop outputting its data file, i.e. it is "turned off," then the created and started actual event instance can be stopped (thus going "low.") As will also be understood, if the single device type (again e.g. 400-J5) has multiple distinct actual devices (such as two separate Kintronic's systems,) then two event instances could be created, started and stopped in parallel, where each create, start and stop mark carries a unique identifier for the specific Kintronic systems as one of its related datum (all as will be understood in light of the prior SARTRIA teachings.)

Referring still to FIG. 8a, once it is understood that primary events 4-$pe$ may be used to represent actual entertainment device states 400-1$ds$ for individual device types (e.g. 400-.15,) it will also be seen that these current device states (i.e. their representative actual event instances,) in combination with the incoming marks 3-$pm$ (representing human 100-4$m$ and machine 200-4$m$ observations,) may be acted upon by mark effects events rules 2$r$-$i$—all as taught in the prior SARTRIA application. Hence, these session processor mark effects events rules 2$r$-$i$ are then serving as the herein specified UAC command issuer 400-1$a$'s external trigger rules 400-1$tr$, thus allowing issuer 400-1$a$ to programmatically respond to the stream of AES session content 400-$i$ (or preferably directly to observations 100-4$m$, 200-4$m$) for the conditional issuance of universal action commands 400-1$uac$ based upon the current device's known state 400-1$ds$ (all as previously specified especially in relation to FIG. 7b.)

And finally still in reference to FIG. 8a, as will be understood by a careful reading of the prior SARTRIA application, during the synthesis stage 30-4 the session processor is able to automatically make its own "internal observations" represented as secondary and tertiary marks. For the purposes of the present invention, it is preferred that tertiary marks 3-$tm$ are used as universal action commands 400-1$uac$. As will be discussed further in relation to upcoming FIG. 8c, these tertiary marks 3-$tm$ are also controllable via external (calc) rules 2$r$-$c$, which then are acting as an extension of the herein taught and anticipated external trigger rules 400-1$tr$. Specifically, if the mark effects events rules 2$r$-$i$ are used to start a single actual event instance representing all specific devices (i.e. rather than one actual instance for each specific device,) then the tertiary rules 2$r$-$c$ may be used to issue multiple tertiary marks 3-$tm$, one for each specific device. Thus, each issued tertiary mark 3-$tm$ would carry a related datum properly addressing it to a single specific device, which in turn means that the session processor acting as a UAC command issuer 400-1$a$ would issue one mark 3-$tm$ to serve as one universal action command 400-1$uac$ for each specific entertainment device (such as multiple Kintronic's systems) as dictated by tertiary rules 2$r$-$c$.

Of course, several variations of these teachings of applying a session processor to implement the preferred UAC command issuer 400-1$a$ are possible, at least including that only one tertiary mark 3-$tm$ (i.e. universal command 400-1$uac$) is issued for each event type 4-$pe$ (i.e. device type such as 400-J5,) regardless of the number of specific entertainment devices of the given type (e.g. two or more Kintronic's systems.) In this case, all of the two or more Kintronic's systems would receive the same universal action command 400-1$uac$ and thus react in the same manner. Even if the two or more specific entertainment devices (or the same general type, e.g. 400-J5 PA and Music System) are from different manufacturers (e.g. one Kintronic's system and one Stentofon system,) they can still receive the same universal action command 400-1$uac$ (i.e. as mark 3-$tm$) since their AES device wrapper 400-1$b$ will properly translate the universal command 400-1$uac$ into appropriate custom API sequences (e.g. 400-15-API,) all a discussed in detail with relation to FIG. 7b.

Thus the careful reader will see that the prior taught steps of the integration and synthesis of session content will suffice for also implementing the herein taught UAC command issuer 400-1$a$ as a session processor similar to 200-5. As will be obvious to those skilled in the art of software systems, doing this has several advantages, not the least of which is the reusability of existing software objects.

Referring next to FIG. 8b, there is shown a detailed diagram of the mark and event objects and their relationships as taught in the SARTRIA application. As can be seen, an event type 4-$a$ is shown to have duration over session time depicted as horizontal length. The event type 4-$a$ is also shown to have three distinct points of creation, starting and stopping—all as triggered by mark types 3-$x$, 3-$y$ and 3-$z$ respectively. Also portrayed are rule stacks 2$r$-$i$ governing the connection (or effect) of a given mark 3-$x$, 3-$y$ and 3-$z$ on its associated event 4-$pe$. Also shown are the new uses for this prior art teaching such that event types 4-$a$ are useable to represent entertainment device types, e.g. 400-J5, where actual event type instances therefor represent that device type's device state 400-1$ds$ (i.e. "high" means the device is currently on, or outputting, while "low" means the device is currently off, or not outputting.) Furthermore, as also taught herein, marks 3-$x$, 3-$y$ and 3-$z$ for creating, starting and stopping the entertainment device's output are equivalent (but not limited to) human observations 100-4$m$, such as made through scorekeeping systems 101, 102, 103, and machine observations 200-4$m$, such as made by performance differentiator 200-4. And finally, rules 2$r$-$i$ for determining if a given mark 3-$x$, 3-$y$ and 3-$z$/observation 100-4$m$, 200-4$m$ should create, start or stop an actual event 4-$a$/device type's state 400-ids incorporate the intended and preferred functions of the external trigger rules 400-1$tr$.

Referring next to FIG. 8$c$, there is show a combination node diagram with a corresponding block diagram detailing the relationship between the tertiary mark (Mc) (i.e. the UAC command 400-1$uac$) and its potential triggering objects such as another mark type (i.e. observations 100-4$m$, 200-4$m$) or an event type (i.e. and e.g. device 400-J5 device state transitions 400-1$ds$.) As will be understood by a careful reading of the prior SARTRIA patent application, each mark type template may be associated with zero or more context datum, where each datum defines a unique piece or set of information that will ultimately become a corresponding related datum when an actual instance of the mark type is created from the template. What is first noted by the present inventors is that the creation and specification of each context datum associated with a (tertiary) mark type (i.e. in this implementation universal action command 400-1$uac$) is controlled by a rule stack. As prior discussed, these rule stacks are sufficiently capable for drawing from any existing session content 200-5$c$ and combining or otherwise calculating to create a new datum. For the purposes of the present invention, these rules stacks perform another of the specified and preferred functions covered under the overall scope of external trigger rules 400-1$tr$ shown in FIG. 7$b$. In this case, the context datum being defined by the rule stack would represent the various universal action command 400-1$uac$ data fields as detailed in FIG. 7$c$.

Still referring to FIG. 7$c$, as will be understood by those familiar with both software systems and the teachings of the prior SARTRIA application, rule stacks may refer to either variable session content defined as the session is in progress, or constants established prior to the session. As will also be understood, all the preferred UAC data fields listed in FIG. 7$c$ fit into either of these two data source types. For example, the following UAC data fields are ideally "pre-known" for which constants may be used for their specification: Device Type, Device ID, Data Source Type, Data Source Connection, Data Source Name, Data Source Use, Data Source Exclusion Filter(s), Data File Format, Data File Start/Stop Control, Initiation Transition Script, Termination Transition Script and Command. The remaining UAC data fields of Data Source Inclusion Filter and the actual Data File might be pre-known or also generated "on-the-fly" using the current session content 200-5$c$. (The creation of these two variable UAC data fields will be discussed in greater detail with respect to FIG. 8$d$.)

The present inventors note that the preceding lists of example "pre-known" data fields vs. "on-the-fly" data fields is to be considered as exemplary rather than limiting. As will be understood by those familiar with software systems and especially the teachings of the prior SARTRIA application, many of the "pre-known" data fields could be implemented as variable data sources taken for instance from what was prior taught in the SARTRIA application as the "session registry." The purpose of the session registry was to serve as a list of all external "input" devices that the session processor should specifically be aware of—hence, any of these registered external devices might at some point be transmitting valid observations for integration, synthesis and expression. The present inventors prefer that the external "output" devices, e.g. entertainment devices such as 400-15, 400-J6, 400-J7, 400-J8$a$, 400-J8$b$ and 400-J9 also use the same registry. Furthermore, the present inventors prefer that each local and remote database or data stream also be "registered" as they serve as session information input. Thus the reader will understand that each registered entertainment devices, databases or data streams will have associated their own particular Device ID, Data Source Connection, Data Source Name, Data File Format and Data File Start/Stop Control, all as "related datum" or similar variable data. Hence, the context datum rule stack used to create any given UAC data field above listed as "pre-known," may preferably use variable data sources to alternately retrieve this pre-known data from the session registry.

As will be understood by those familiar with rule-based software systems, rather than using constant values, it is preferable to have context datum specification rules that refer to variable data sources which themselves are pointed to a session registry. In this way, one single set of rules can service any number of sessions being performed at potentially different locals with different entertainment devices, databases, etc (i.e. presumably with different session registry entries.) While this type of data factoring is a critical teaching of the prior SARTRIA application, it is merely being restated here as a matter of showing that the session processor and all of its features are usable for implementing the preferred UAC command issuer 400-1$a$. Regarding the UAC data fields being pre-definable as context datum associated to a tertiary mark (representing a UAC command 400-1$uac$,) it should also be obvious that the data fields of Initiation Transition Script and Termination Transition Script are forms of a database and as such could likewise be defined as registered devices.

And finally, still referring to FIG. 8$c$, for each tertiary mark type serving as a universal action command 400-1$uac$, the prior SARTRIA teaching provided for what was called a "trigger object." This object could either be another mark or an event. For the purposes of implementing the UAC command issuer 400-1$a$, the preferred trigger object is of course the event type 4-$pe$ established to represent the entertainment device (e.g. 400-.15) going through its on/off device state 400-1$ds$ changes. Hence, a simple association between the "PA and Music System" event type and the UAC tertiary command mark representing "start music" are sufficient to trigger the automatic issuance of the UAC command 400-1$uac$. As will be further understood by a careful reading of the SARTRIA application with respect to is corresponding FIG. 31, the "set time" parameter associated with the event type trigger can be set to either "event start" or "event stop." Hence, in this example, the set time would be set to "event start," which is also carrying the meaning that the music system's device state is "on" (as previously discussed especially in relation to FIG. 8$a$.) In a similar manner, a second UAC tertiary command mark is preferably associated with the same "PA and Music System" event type for issuance of the "stop music" UAC command 400-1$uac$. In this case, the set time is obviously set to be at "event stop."

It is also noted that the original SARTRIA teaching included a rule stack in association with the trigger object, whether the trigger was a mark or in this AES example case an event type. This rule stack is meant to provide a conditional test before simply issuing the universal command mark to "start music" or "stop music." However, as will be understood by a careful reading, since the event type itself represents the entertainment device's state, the rule stack which governs that event's starting and stopping is sufficient for also triggering the UAC command 400-1*uac* issuance. Therefore the reader will understand that the trigger object associated with the universal command mark does not require an associated rule stack for the preferred implementation of the UAC command issuer 400-1*a*.

Referring next to FIG. 8*d*, there is shown the original SARTRIA teaching for a "descriptor." In general, a descriptor, also called a descriptor stack, is capable of conditionally concatenating any number of tokens into strings, where an individual token may itself be another string. Furthermore, any individual token could be a constant or a variable drawn from any existing session content 200-5*c*. Tokens could also have either, neither or both a pre-fix and suffix. A thorough understanding of the SARTRIA teachings will show that this powerful teaching allows for the simple creation of an object name, e.g. "Home Goal 3," or the more complex creation of a prose description, e.g. "At 15:07 in the first period, number #17 Hospodar took a pass from #29 Donavan to put the Jr. Flyer's up 1 to 0, which was enough for a victory as the Jr. Flyer goalie Aman stopped all 23 of the Colonials shots." In the prior SARTRIA application, these descriptors were used to automatically generate names and descriptions for the various events being created, started or stopped.

Still referring to FIG. 8*d*, the present inventors teach the additional use of descriptors for creating these same conditionally concatenated strings for any context datum (e.g. those related to a tertiary mark representing a UAC command 400-1*uac*,) not just an event type. This teaching is represented in the node diagram at the top left dotted box area of FIG. 8*d* as the association line joining the context datum (CD) with the naming rule (L). For the present example of implementing universal action commands 400-1*uac* with tertiary marks and their related datum (as defined by a template context datum,) the two UAC data fields most benefited by using a descriptor stack are the Data Source Inclusion Filter and the Data File. As was previously discussed herein with reference to FIGS. 7*c* and 7*d*, the Data Source Inclusion Filter could be an SQL select statement for querying a database of potential Data Files for output by the desired entertainment device, for example a database of music for output by a PA and Music System 400-15. As will be understood by those familiar with software databases that implement a SEQUEL (SQL) relational database model, an SQL select statement comprises a combination of standard keywords and clauses (such as "SELECT," "FROM," "WHERE," "GROUP BY," etc.) along with their associated variables. As will also be understood, the descriptor tokens set to a constant may be used to implement the keywords or clauses while the tokens set to a session content variable may be used to as the SQL clause variables. (Note that it is also possible to use the prefix or suffix to a variable descriptor token for representing the keyword or clause, i.e. rather than creating an additional constant descriptor token.)

What is most important to be understood is that the descriptor object as prior taught in the present inventor's SARTRIA application is useable as-is in association with any context datum to adequately create at least both simple and complex event descriptions as well as SQL select statements. The event descriptions (such as "Great save on shot 28 by home goalie David Aman") are ideal as automatically generated Data Files for attaching as related data to a tertiary mark (i.e. being used to implement a UAC command 400-1*uac*,) which for instance could be issued to a PA and Music System 400-J5 entertainment device for creating an audio output via a text-to-speech conversion, or to a Video Display 400-.16 entertainment device for visual posting. The SQL select statements (such as "SELECT FROM database WHERE sport=ice hockey") are ideal as automatically generated Data Source Inclusion Filters for also attaching as related data to a tertiary mark (i.e. being used to implement a UAC command 400-1*uac*,) which for instance could be issued to a PA and Music System 400-J5 entertainment device for playing music, where the SQL select statement is then used by the entertainment device (or its associated wrapper 400-1*b*) to query a database of music to retrieve one or more possible Data Files for output. As will also be understood by a careful reading of the present application, the issuance of an ongoing stream of tertiary marks (representing universal action commands 400-1*uac*) with associated related datum describing current happenings (as derived from either observation 100-4*m*, 200-4*m* marks or integrated events,) can be used as a Data Stream for creating an on-going commentary of the performance to be output on various audio or video entertainment devices.

CONCLUSION AND RAMIFICATIONS

Thus the reader will see that the present invention teaches its objects and advantages as summarized in the opening of the specification including:

Providing a universal interface module that can be connected to a scoreboard console either at the juncture between the console's keyboard and its internal processor, or between its internal processor and the scoreboard itself where this interface module provides both training and live modes. In the training mode, the module is capable of recording various signals that are either supplied by the keyboard to the console, or by the console to the scoreboard, representing the entire range of possible low-level commands performed by the manufacturer's scoreboard console. In the live mode, the module is capable of receiving high-level commands from a third-party scorekeeping console which are then translated into the equivalent low-level commands and transmitted either to the scoreboard console via the keyboard, as if they were being directly entered by the scoreboard console operator, or transmitted to the real scoreboard, as if they were being generated by the manufacturer's console;

Providing a universal interface module that is cable of connecting a third-party scorekeeping console to a scoreboard without requiring a training mode. In this case, the scorekeeping console maintains an internal virtual scoreboard that the interface module translates into the necessary signals for updating the real scoreboard;

Provide a scorekeeping system that allows the game officials in combination with a performance content generation system that comprises an object tracking system, to perform all official scorekeeping tasks including at least the operation of the game clock and the entry of shots, goals and penalties information—thus providing the option of eliminating the traditional scorekeeper;

Providing apparatus and data translations methods for receiving human and machine observations from the combination of a scorekeeping system and a performance content generation system as related at least to a sports performances such as a game, and then automatically determining when and which connected entertainment devices should be commanded to take which specific actions; where the entertainment devices at least include music and announcement systems, video displays, scoring indication lamps, primary arena lighting systems, laser show and secondary lighting systems as well as dynamic advertising display boards, and Providing for the implementation of the preferred automatic entertainment processor using the prior taught session processor and its various features.

As will be apparent to those familiar with the various marketplaces and technologies discussed herein, portions of the present invention are useful individually or in lesser combinations than the entire scope of the aforementioned objects and advantages. Furthermore, while the apparatus and methods are exemplified with respect to the sport of ice hockey, as will be obvious to the skilled reader, there are no restrictions on the application of the present teachings, whether to other sports, music, theatre, education, security, business, etc., and in general to any ongoing measurable activities, real, virtual, abstract, animate or inanimate, without limitation. The lack of a need or use in other such applications for a scorekeeping system does not reduce the benefits provided by a using a performance content generation system in combination with an automatic entertainment system.

Furthermore, as will be obvious to those skilled in the arts of signage control systems, the present teachings in general relate to any "closed" signage control system that includes both a manually operated console for accepting signage control signals via a keyboard and then also for generating translated control signals for output to one or more signage. While this type of signage control system is prevalent in sports, the present invention should not be limited to sporting applications, but rather to the situation of allowing a third party system to control a signage by issuing appropriate signals through an interface module that connects with the originally supplied console for operating the signage. This universal interface apparatus and method is especially useful when the third party system not only includes data for display on the signage, but also is capable of receiving inputs automatically sensed from the surrounding environment, thus providing for an automatic means of changing signage display based at least in part by the uncontrolled dynamic changes in the environment that the signage is meant to service.

From the foregoing detailed description of the present invention, it will be apparent that the invention has a number of advantages, some of which have been described herein and others of which are inherent in the invention. Also, it will be apparent that modifications can be made to the present invention without departing from the teachings of the invention, including the sub-division of useful parts for lesser apparatus and methods, still wholly encompassing one or more ideas herein taught.

It is understood that the examples and embodiments that are described herein are for illustrative purposes only and that various modifications and changes in light thereof will be suggested to persons skilled in the art and are to be included with the spirit and purview of this application and scope of the appended claims and their full scope of equivalents. For example, the order of processing of information is preferred and sufficient but can be adjusted and rearranged with acceptable tradeoffs. Stages and steps that are depicted in series may instead occur in parallel. Stages or steps may be skipped, other stages and steps may be added, etc. Also for example, the software descriptions, encapsulations, attributes and methods suggested and preferred by the present inventors to best embody the taught apparatus and methods are a hybrid of well understood object oriented concepts. Other software modalities are sufficiently equivalent to alternately embody the taught apparatus and methods without departing from the teachings herein. Furthermore, software modules and objects could be combined or broken apart, associations between objects could be varied, and attributes could be shifted between objects or converted into new objects. Existing objects could be converted into attributes or methods within other existing or new objects, etc.

Accordingly, the scope of the invention is only to be limited as necessitated by the accompanying claims.

The invention claimed is:

1. A system comprising:
   a game data input operable to receive game data associated with an athletic event; one or more video inputs, each operable to receive video data from at least one of a plurality of associated video cameras;
   a controller, including a processor and memory, operable to select or control operation of at least one of the plurality of associated video cameras in accordance with received game data; and
   an output operable to communicate event data comprised of video data from one or more selected or controlled video cameras,
   wherein the event data further includes scoreboard data corresponding to received game data.

2. The system of claim 1 wherein the scoreboard data includes official time data corresponding to received game data.

3. The system of claim 2 wherein the controller is further operable to:
   receive the video data;
   detect objects depicted by the video data; and
   select or control operation of one or more video cameras in accordance with detected objects.

4. The system of claim 3 wherein the game data input is further operable to receive the game data from an associated scorekeeping console.

5. The system of claim 4 wherein the scorekeeping console is operable to receive game-related input via a user interface from an associated scoreboard operator.

6. The system of claim 1 wherein the memory is configured to store team roster data comprising player names and associated player uniform numbers;
   wherein the controller is further operable to detect player uniform numbers from received video data;
   wherein the controller is further operable to generate identifier data by association of detected player uniform numbers with team roster data; and
   wherein the controller is further operable to generate the event data including the identifier data.

7. The system of claim 1 wherein the controller is further operable to generate index data corresponding to game events detected from the video data; and
   wherein the controller is further operable to generate the event data including the index data.

8. A method comprising:
   receiving scoreboard data associated with a scoreboard display at an athletic event;
   receiving video data of the athletic event from a plurality of associated video cameras;
   selecting or controlling, via a controller including a processor and memory, operation of at least one of the plurality of associated video cameras in accordance with received scoreboard data; and
   communicating event data comprised of video data from one or more selected or controlled video cameras,
   wherein the event data further includes the scoreboard data.

9. The method of claim 8 wherein the scoreboard data includes official time relative to the athletic event corresponding to received game data.

10. The method of claim 9 further comprising:
receiving the video data;
detecting objects depicted by the video data via the controller; and
selecting or controlling operation of one or more video cameras in accordance with detected objects.

11. The method of claim 10 further comprising receiving the game data from an associated scorekeeping console.

12. The method of claim 11 further comprising receiving game-related input via a user interface from an associated scoreboard operator.

13. The method of claim 8 further comprising:
storing team roster data comprising player names and associated player uniform numbers in an associated data storage;
detecting, via the controller, player uniform numbers from received video data;
generating identifier data by association of detected player uniform numbers with team roster data; and
generating the event data including the identifier data.

14. The method of claim 8 further comprising generating, via the controller, index data corresponding to game events detected from the video data.

15. A system comprising:
an input operable to receive game play data indicative of active play in a sporting event;
a plurality of video cameras directed to the sporting event;
a controller including a processor and memory operable to receive video data from each of the plurality of video cameras;
the controller operable to detect objects relating to the game event from received video data;
the controller operable to select or control at least one of the plurality of video cameras in accordance with the game play data and the and detected objects; and
the controller operable to output game data comprised of video data corresponding to selection or control of each of the plurality of video cameras by the controller.

16. The system of claim 15 further wherein the input is operable to receive the game play data corresponding to an audible input from the sporting event.

17. The system of claim 16 wherein the audible input is comprised of a whistle.

18. The system of claim 15 wherein the input is operable to receive the game play data corresponding to an optical input from the sporting event.

19. The system of claim 15 wherein at least one of the video cameras comprise the optical input.

20. The system of claim 19 further comprising the controller operable to select or control at least one of the plurality of cameras in accordance with the plurality of detected objects comprising a recognized player formation associated with the sporting event.

* * * * *